US011307475B2

(12) United States Patent
Mathew et al.

(10) Patent No.: US 11,307,475 B2
(45) Date of Patent: Apr. 19, 2022

(54) BIRD FRIENDLY ELECTROCHROMIC DEVICES

(71) Applicant: View, Inc., Milpitas, CA (US)

(72) Inventors: John Gordon Halbert Mathew, Santa Rosa, CA (US); Robert T. Rozbicki, Los Gatos, CA (US); Luis Vidal Ponce Cabrera, Olive Branch, MS (US); Anshu A. Pradhan, Collierville, TN (US); Abhishek Anant Dixit, Collierville, TN (US); Eithan Ritz, Memphis, TN (US)

(73) Assignee: View, Inc., Milpitas, CA (US)

( * ) Notice: Subject to any disclaimer, the term of this patent is extended or adjusted under 35 U.S.C. 154(b) by 267 days.

(21) Appl. No.: 16/427,283

(22) Filed: May 30, 2019

(65) Prior Publication Data

US 2019/0294016 A1   Sep. 26, 2019

Related U.S. Application Data

(63) Continuation-in-part of application No. 15/738,110, filed as application No. PCT/US2016/041348 on Jul. 7, 2016.

(Continued)

(51) Int. Cl.
*G02F 1/153* (2006.01)
*A01M 29/08* (2011.01)

(52) U.S. Cl.
CPC .......... *G02F 1/1533* (2013.01); *A01M 29/08* (2013.01)

(58) Field of Classification Search
CPC .... G02F 1/157; G02F 1/1533; G02F 2203/58; H01J 37/3429; C23C 14/34; C23C 14/10;

(Continued)

(56) References Cited

U.S. PATENT DOCUMENTS 6,514,431 B1   2/2003   Nishikitani et al.
8,114,503 B2   2/2012   Klem, Jr.
(Continued)

FOREIGN PATENT DOCUMENTS

CN   101308264 A   11/2008
CN   202819146 U    3/2013
(Continued)

OTHER PUBLICATIONS

Extended European Search Report dated Jan. 23, 2019 issued in EP Application No. 16824922.5.

(Continued)

*Primary Examiner* — Marin Pichler
(74) *Attorney, Agent, or Firm* — Weaver Austin Villeneuve & Sampson LLP; Brian D. Griedel

(57) ABSTRACT

Various embodiments herein relate to electrochromic windows that are bird friendly, as well as methods and apparatus for forming such windows. Bird friendly windows include one or more elements that make the window visible to birds so that the birds recognize that they cannot fly through the window. An electrochromic window includes one or more transparent substrates, wherein at least one of the substrates is an electrochromic (EC) lite including an electrochromic device and a pattern formed on at least one of the substrates by a laser, the pattern including a first feature configured to provide a set of optical properties different than optical properties of the transparent substrate. The set of optical properties includes one or more characteristics of refractivity, reflectivity and diffraction.

15 Claims, 25 Drawing Sheets

Related U.S. Application Data

(60) Provisional application No. 62/269,721, filed on Dec. 18, 2015, provisional application No. 62/238,609, filed on Oct. 7, 2015, provisional application No. 62/191,182, filed on Jul. 10, 2015.

(58) Field of Classification Search
CPC .............. C23C 14/083; C23C 14/5873; C03C 17/2456; C03C 17/2453; C03C 17/34; C03C 17/23; C03C 2218/34; C03C 2218/33; C03C 2218/154; C03C 2217/70; C03C 2217/72; C03C 2217/74; C03C 2217/213; C03C 2217/212; C03C 2218/328; B32B 17/06; B32B 2419/00; B32B 2307/416; B32B 2307/20; B32B 2255/20; A01M 29/08; E06B 9/24; E06B 2009/2405; E06B 2009/2464
USPC ........................................................ 359/275
See application file for complete search history.

(56) References Cited

U.S. PATENT DOCUMENTS

| | | | |
|---|---|---|---|
| 8,164,818 | B2 | 4/2012 | Collins et al. |
| 8,764,950 | B2 | 7/2014 | Wang et al. |
| 8,869,480 | B2 | 10/2014 | Klem, Jr. |
| 9,007,674 | B2 | 4/2015 | Kailasam et al. |
| 9,517,721 | B2 | 12/2016 | Frey et al. |
| 9,664,974 | B2 | 5/2017 | Kozlowski et al. |
| 9,974,298 | B2 | 5/2018 | Arnold et al. |
| 10,101,510 | B2 | 10/2018 | Arkles |
| 2003/0227664 | A1* | 12/2003 | Agrawal ............... G02F 1/1533 359/269 |
| 2006/0098264 | A1 | 5/2006 | Park |
| 2007/0044731 | A1 | 3/2007 | Klem, Jr. |
| 2007/0201122 | A1 | 8/2007 | Dozeman et al. |
| 2009/0047487 | A1 | 2/2009 | Klem, Jr. |
| 2010/0025387 | A1 | 2/2010 | Arai et al. |
| 2011/0013254 | A1 | 1/2011 | Widjaja et al. |
| 2012/0033287 | A1 | 2/2012 | Friedman et al. |
| 2012/0113519 | A1 | 5/2012 | Klem, Jr. |
| 2013/0258436 | A1 | 10/2013 | Podbelski et al. |
| 2014/0043667 | A1 | 2/2014 | Bergh et al. |
| 2014/0340730 | A1* | 11/2014 | Bergh .................... B23K 26/40 359/275 |
| 2015/0345206 | A1 | 12/2015 | Vikor et al. |
| 2017/0020123 | A1* | 1/2017 | Arnold ............... B23K 26/0006 |
| 2017/0176831 | A1* | 6/2017 | Dixit .................... B32B 38/105 |
| 2018/0173071 | A1 | 6/2018 | Mathew et al. |
| 2020/0174333 | A1 | 6/2020 | Mathew et al. |

FOREIGN PATENT DOCUMENTS

| | | |
|---|---|---|
| EP | 1319335 A1 | 6/2003 |
| WO | 2010-099147 | 9/2010 |
| WO | 2014-134120 | 9/2014 |
| WO | WO2016/085964 | 6/2016 |

OTHER PUBLICATIONS

International Preliminary Report on Patentability dated Jan. 25, 2018 issued in PCT Application No. PCT/US2016/041348.
Wildner, W., et al. "Wavelength Dependent Haze of Transparent Glass-Particle Filled Poly(Methyl Methacrylate) Composites," ISRN Optics, vol. 2014, Article ID 802369, 5 pages.
Window Alert, "Millions of wild birds are killed each year flying into Windows; Now you can save the lives of the beautiful birds you love," webpage downloaded on Dec. 19, 2017 from https://windowalert.com/, 4 pages.
CollidEscape webpage downloaded on Dec. 19, 2017 from http://www.collidescape.org/home, 1 page.
GolrayGlass, "Silkscreened Ceramic Frit," webpage downloaded on Dec. 19, 2017 from https://www.goldrayglass.com/products/silkscreened-ceramic-frit/, 5 pages.
Ornilux Bird Protection Glass, "The Future of Bird-Friendly Architecture is Clear . . . ," webpage downloaded on Dec. 19, 2017 from http://ornilux.com/, 2 pages.
GlasPro, "GlasPro-Bird Safe: Bird Friendly Glass for Building and Zoos," webpage downloaded on Dec. 19, 2017 from http://www.glas-pro.com/products/glas-pro-bird-glass/, 2 pages.
International Search Report and Written Opinion issued in PCT Application No. PCT/US16/41348, dated Dec. 12, 2016.
U.S. Office Action dated Jun. 18, 2019 in U.S. Appl. No. 15/738,110.
U.S. Office Action dated Sep. 13, 2019 in U.S. Appl. No. 15/738,110.
Ödeen, A. et al., "The phylogenetic distribution of ultraviolet sensitivity in birds," BMC Evoluntionary Biology, vol. 13:36, 2013, 10 pp.
U.S. Final Office Action dated Jan. 22, 2020 in U.S. Appl. No. 15/738,110.
U.S. Office Action dated Jun. 2, 2020 in U.S. Appl. No. 15/738,110.
U.S. Final Office Action dated Sep. 9, 2020 in U.S. Appl. No. 15/738,110.
U.S. Office Action dated Apr. 2, 2021 in U.S. Appl. No. 15/738,110.
U.S. Final Office Action dated Jul. 9, 2021 in U.S. Appl. No. 15/738,110.
European Office Action dated Aug. 12, 2020 in EP Application No. 16824922.5.
Chinese Office Action dated Jul. 24, 2020 in CN Application No. 201680046456.9.
Chinese Second Office Action dated Apr. 7, 2021 in CN 201680046456.9.
Advisory Action dated Oct. 20, 2021 in U.S. Appl. No. 15/738,110.
CN Office Action dated Sep. 22, 2021, in application No. CN20168046456 with English translation.

\* cited by examiner

BIRD FRIENDLY ELECTROCHROMIC DEVICES

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well known electrochromic material, for example, is tungsten oxide ($WO_3$). Tungsten oxide is a cathodic electrochromic material in which a coloration transition, transparent to blue, occurs by electrochemical reduction.

Electrochromic materials may be incorporated into, for example, windows and mirrors. The color, transmittance, absorbance, and/or reflectance of such windows and mirrors may be changed by inducing a change in the electrochromic material. While electrochromism was discovered in the 1960's, electrochromic devices have not realized their full commercial potential.

Electrochromic windows show promise as a viable "green" technology. As electrochromic glass is deployed in greater amounts, there arises a need to produce products that address the need not only for energy savings, aesthetics and occupant comfort, but also other environmental issues.

SUMMARY

Various embodiments herein relate to electrochromic windows that are patterned or otherwise fabricated to be bird friendly. Also disclosed are methods and apparatus for fabricating such windows. The pattern may be formed in a way that renders the window visible to birds but not to humans, thereby reducing bird mortality while ensuring an unobstructed view for human occupants. In certain embodiments, electrochromic windows are augmented to include bird friendly features that do not necessarily include a pattern.

In accordance with some embodiments, an electrochromic window includes one or more transparent substrates, wherein at least one of the substrates is an electrochromic (EC) lite including an electrochromic device, and a pattern formed on or in at least one of the substrates by a laser, the pattern including a first feature configured to provide a set of optical properties different than optical properties of the transparent substrate. The set of optical properties includes one or more characteristics of refractivity, reflectivity and diffraction.

In some examples, the pattern may be formed on the EC lite. In some examples, the pattern may be formed on a surface of the EC lite opposite to the electrochromic device. In some examples, the pattern may be formed on the EC light by operating the laser in a regime selected to form the pattern without damaging the electrochromic device. In some examples, the pattern may include a sequence of microcracks formed on a surface or in an interior of the EC light by operating the laser. In some examples, the laser operating regime may include a train of micro-pulses, each micro-pulse being less than 10 nanoseconds duration. In some examples, the train of micro-pulses may integrate into a laser exposure period of about 100-1000 microsecond.

In some examples, the pattern may be formed on the EC light by operating the laser in a regime selected to form the pattern elements by inducing local changes to a refraction index of the EC light. In some examples, the laser-induced local change to the refraction index may be configured to result in the pattern being visible to birds and invisible to humans. In some examples, the laser operating regime may result in a pulse fluence that creates local densification of the EC light that locally increases the refractive index of the EC light and is below a microcracking threshold of the EC light. In some examples, the laser operating regime may include a train of micro-pulses, each micro-pulse being less than 20 nanoseconds duration. In some examples, the train of micro-pulses may include less than 100 micropulses. In some examples, the train of micro-pulses may include less than 20 micropulses.

In some examples, the pattern may include a diffraction grating on a surface of the EC light opposite to the electrochromic device. In some examples, the diffraction grating may be formed on the EC light by operating the laser in a regime selected to locally ablate micro-spots, each microspot having a dimension in the range of 1 to 50 µm. In some examples, the micro-spots may have a diameter to depth ratio greater than 20.

In some examples, the electrochromic window may be configured such that the pattern is positioned outboard of the electrochromic device.

In some examples, the pattern may be formed on the window after the EC lite and at least one additional transparent substrate are formed into an insulated glass unit (IGU).

In some examples, a first pattern may be formed on a first of the one or more substrates and a second pattern is formed on a second of the one or more substrates.

In some examples, the pattern may comprise elements including one or more intersecting or non-intersecting stripes or bars and/or a plurality of dots.

In some examples, at least some of the elements may have a cross sectional dimension of smaller than 0.5 mm.

In some examples, at least some of the elements may have a cross sectional dimension of smaller than 0.2 mm.

According to some embodiments, an integrated glass unit (IGU) includes at least two transparent substrates, wherein at least one of the substrates is an electrochromic (EC) lite having an electrochromic device disposed thereon, and a pattern formed on or in at least one of the substrates by a laser, the pattern including a first feature configured to provide a set of optical properties different than optical properties of the transparent substrate. The set of optical properties includes one or more characteristics of refractivity, reflectivity and diffraction.

In some examples, the pattern may be formed on the EC lite by operating the laser in a regime selected to form the pattern without damaging electrochromic device.

In some examples, the pattern may comprise elements including one or more intersecting or non-intersecting stripes or bars and/or a plurality of dots.

According to some embodiments, a method of fabricating an electrochromic window includes preparing an electrochromic (EC) lite of the EC window by disposing an EC device on a first transparent substrate and forming, with a laser, a pattern on or in at least one of the EC light and a second transparent substrates of the electrochromic window, the pattern including a first feature configured to provide a set of optical properties different than optical properties of the transparent substrates. The set of optical properties includes one or more characteristics of refractivity, reflectivity and diffraction.

In some examples, forming the pattern on the EC light may include operating the laser in a regime selected to form the pattern without damaging electrochromic device. According to some embodiments, the laser operating regime may include a train of micro-pulses, each micro-pulse being less than 10 nanoseconds duration and the train of micro-pulses integrates into a laser exposure period of about 100-1000 microsecond.

In some examples, forming the pattern on the EC may include operating the laser in a regime selected to form the pattern elements by inducing local changes to a refraction index of the EC light.

In some examples, the pattern may include a diffraction grating on a surface of the EC light opposite to the electrochromic device and forming the diffraction grating on the EC light includes operating the laser in a regime selected to locally ablate micro-spots, each micro-spot having a dimension in the range of 1 to 50 m.

In some examples, the pattern may comprise elements including one or more intersecting or non-intersecting stripes or bars and/or a plurality of dots.

These and other features and advantages of the disclosed embodiments will be described in further detail below, with reference to the associated drawings.

BRIEF DESCRIPTION OF THE DRAWINGS

The following detailed description can be more fully understood when considered in conjunction with the drawings in which.

DETAILED DESCRIPTION

Figure 1:
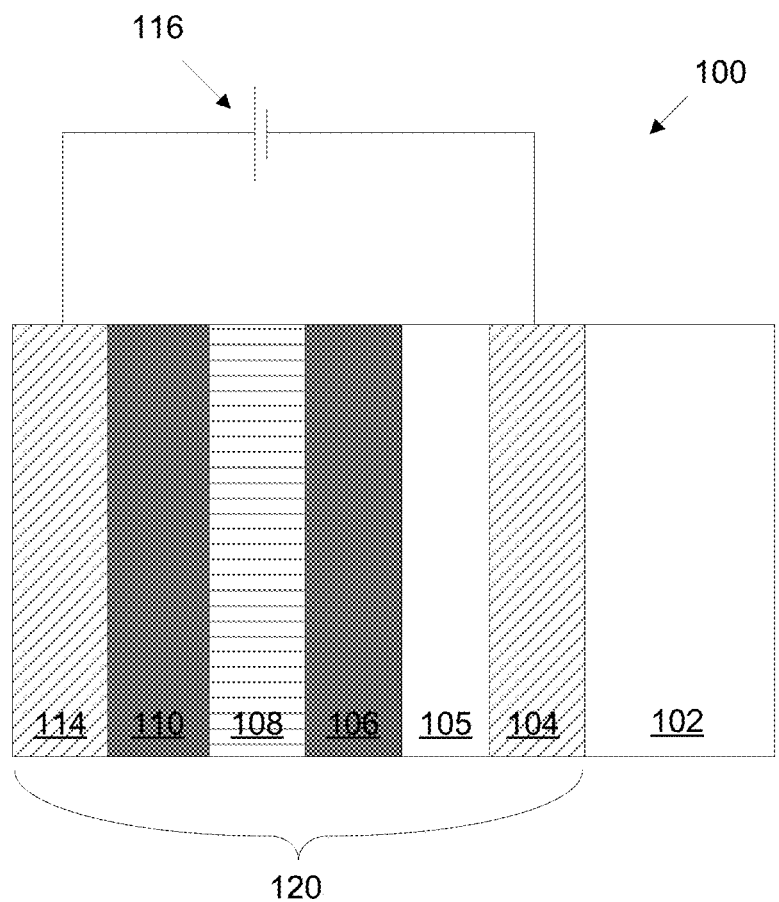
FIG. 1 illustrates a cross sectional view of an electrochromic device according to certain embodiments.

A schematic cross-section of an electrochromic device 100 in accordance with some embodiments is shown in FIG. 1. The electrochromic device includes a substrate 102, a conductive layer (CL) 104, a defect-mitigating insulating layer (DMIL) 105, an electrochromic layer (EC) 106 (sometimes also referred to as a cathodically coloring layer or a cathodically tinting layer), an ion conducting layer or region (IC) 108, a counter electrode layer (CE) 110 (sometimes also referred to as an anodically coloring layer or anodically tinting layer), and a conductive layer (CL) 114. Elements 104, 105, 106, 108, 110, and 114 are collectively referred to as an electrochromic stack 120. A voltage source 116 operable to apply an electric potential across the electrochromic stack 120 effects the transition of the electrochromic device from, e.g., a clear state to a tinted state. In other embodiments, the order of layers is reversed with respect to the substrate. That is, the layers are in the following order: substrate, conductive layer, defect-mitigating-insulating layer, counter electrode layer, ion conducting layer, electrochromic material layer, conductive layer.

In various embodiments, the ion conductor region 108 may form from a portion of the EC layer 106 and/or from a portion of the CE layer 110. In such embodiments, the stack 120 may be deposited to include cathodically coloring electrochromic material (the EC layer) in direct physical contact with an anodically coloring counter electrode material (the CE layer). The ion conductor region 108 (sometimes referred to as an interfacial region, or as an ion conducting substantially electronically insulating layer or region) may then form where the EC layer 106 and the CE layer 110 meet, for example through heating and/or other processing steps. In some embodiments, the device contains no ion conductor region as deposited.

In various embodiments, one or more of the layers shown in FIG. 1 may be deposited to include two or more sublayers. In one example, the EC layer 106 and/or the CE layer 110 may be deposited to include two or more sublayers. The sublayers within a given layer may have different compositions and/or morphologies. The sublayers may be included to promote formation of the ion conducting region 108 and/or to tune various properties of the electrochromic device 100.

Further, an electrochromic device may include one or more additional layers not shown in FIG. 1. Such layers may improve optical performance, durability, hermeticity, and the like. Examples of additional layers that may be used include, but are not limited to, anti-reflective layers, additional defect-mitigating insulating layers (which may be provided within or between any of the layers shown in FIG. 1), and/or capping layers. The techniques disclosed herein are applicable to a wide variety of electrochromic device designs.

In normal operation, the electrochromic device reversibly cycles between at least two optical states such as a clear state and a tinted state. In the clear state, a potential is applied to the electrochromic stack 120 such that available ions in the stack that can cause the electrochromic material 106 to be in the tinted state reside primarily in the counter electrode 110. When the potential on the electrochromic stack is reversed, the ions are transported across the ion conducting layer 108 to the electrochromic material 106 and cause the material to enter the tinted state.

It should be understood that the reference to a transition between a clear state and tinted state is non-limiting and suggests only one example, among many, of an electrochromic transition that may be implemented. Unless otherwise specified herein, whenever reference is made to a clear-tinted transition, the corresponding device or process encompasses other optical state transitions such as non-reflective-reflective, transparent-opaque, etc. Further the terms "clear" and "bleached" refer to an optically neutral state, e.g., untinted, transparent or translucent. Still further, unless specified otherwise herein, the "color" or "tint" of an electrochromic transition is not limited to any particular wavelength or range of wavelengths. As understood by those of skill in the art, the choice of appropriate electrochromic and counter electrode materials governs the relevant optical transition.

In certain embodiments, all of the materials making up electrochromic stack 120 are inorganic, solid (i.e., in the solid state), or both inorganic and solid. Because organic materials tend to degrade over time, inorganic materials offer the advantage of a reliable electrochromic stack that can function for extended periods of time. Materials in the solid state also offer the advantage of not having containment and leakage issues, as materials in the liquid state often do. Each of the layers in the electrochromic device is discussed in detail, below. It should be understood that any one or more of the layers in the stack may contain some amount of organic material, but in many implementations one or more of the layers contains little or no organic matter. The same can be said for liquids that may be present in one or more layers in small amounts. It should also be understood that solid state material may be deposited or otherwise formed by processes employing liquid components such as certain processes employing sol-gels or chemical vapor deposition.

While windows (and electrochromic windows in particular) can be used to create an aesthetically pleasing building design, they can also present problems to certain animals. In particular, birds may fail to appreciate the presence of a window and try to fly through it. The reflective or transparent nature of windows makes them difficult to detect by birds. This problem may be particularly bad when the windows are positioned near areas with trees, shrubs, and other plant life to which the bird may be attracted. In some cases a bird may be attracted to an item behind the window, and in other cases a bird may be attracted to an image reflected in the glass. Unfortunately, many birds do not survive a collision with a window, and some of those who survive may be injured by the collision. Given the energy savings potential and occupant comfort aspects of electrochromic windows, it is expected that large numbers of electrochromic windows will be deployed in the coming years; thus, bird friendly options are necessary.

Avian Vision Vs. Human Vision

Various embodiments herein relate to electrochromic or other windows having one or more optical characteristics that dissuade birds from flying into the windows. Such windows may be referred to as bird friendly windows. Certain embodiments may also relate to particular portions (e.g., layers or stacks of layers) of a bird friendly window, as well as methods and apparatus for making such windows. The techniques described herein are also applicable to electrochromic devices incorporated into other (non-window) products as appropriate, and to other optically switchable devices such as liquid crystal devices and electrophoretic devices, which may be incorporated into window products or other products.

In order for a window to be considered bird friendly, it should include one or more features that make the window appear to the bird as if the window cannot be flown through. One technique involves patterning the window so that a bird will see contrasting features and believe it cannot fit through the spaces in the pattern. Unfortunately, conventional patterning can also deleteriously affect the view through the window for human occupants. Because windows are typically used (at least in part) to provide human occupants with a view to the outside, such patterning is undesirable if it can be perceived by human eyes. As such, various techniques described herein may be used to render an electrochromic window pattern visible to birds (such that birds are discouraged from trying to fly through the window) while maintaining an unobstructed view through the window for humans, that is, they are selective so that birds see the visual deterrent while to humans the deterrent is e.g., visually indiscernible or nearly so. In certain embodiments, an electrochromic window may be patterned such that birds can see the pattern and humans cannot. For instance, the pattern may reflect, absorb, or scatter light only in wavelengths that are visible to birds but not humans (e.g., only reflecting in ultraviolet wavelengths, as explained further with regard to FIGS. 2A and 2B, below). In these or other cases, an electrochromic window may be fabricated to appear hazy to birds but clear to humans (e.g., the window may scatter substantial amounts of light at UV wavelengths but not at wavelengths visible to humans).

Both human and avian eyes use two types of light receptors: rods and cones. Rods are sensitive to small quantities of light and are better for vision during the night. Cones detect specific wavelengths of light and are better suited for seeing color. Humans are trichromatic and have only three types of cones in their eyes, each having a distinctive response range of wavelengths with a maximum absorbance peak. By contrast, most birds are tetrachromatic, having four different types of cones. Some studies have also suggested that certain birds may be pentachromatic, having five different types of cones.

Color vision in birds can be categorized into two groups: violet sensitive (VS) and ultraviolet sensitive (UVS). Birds having UVS vision have a pigment in their cones that absorbs UV light, thereby allowing these birds to see into the UV spectrum. It is believed that the majority of avian species have UVS vision, including birds that are in the clades of palaeognathae (ratites and tinamous), charadriiformes (shorebirds, gulls, and alcids), trogoniformes (trogons), psittaciformes (parrots), and passeriformes (perching birds). (Ödeen A, Håstad O: The phylogenetic distribution of ultraviolet sensitivity in birds. *BMC Evol Biol* 2013, 13:36). In nature, birds may take advantage of this UV vision through courtship (e.g., using UV reflective plumage to attract mates), hunting (e.g., tracking UV reflection of rodent waste), and other adaptations. In many embodiments, electrochromic windows are designed to be "bird friendly" to birds that have UVS vision.

Figure 2A:
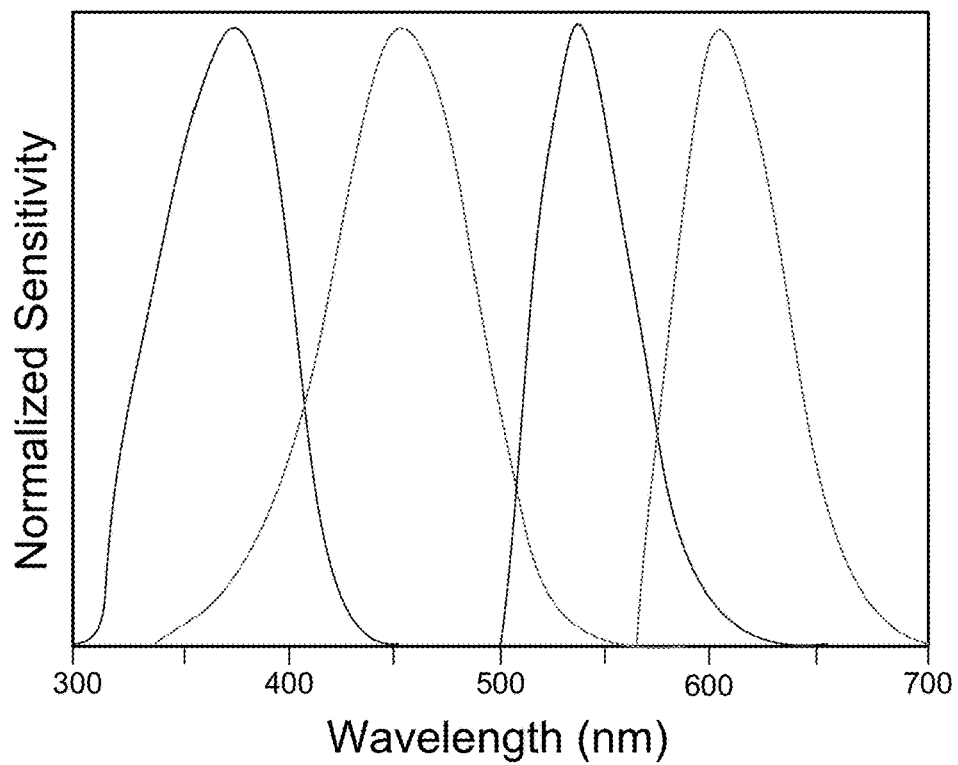
FIG. 2A depicts the spectral sensitivity for an ultraviolet sensitive (UVS) bird over a range of wavelengths.
Figure 2B:
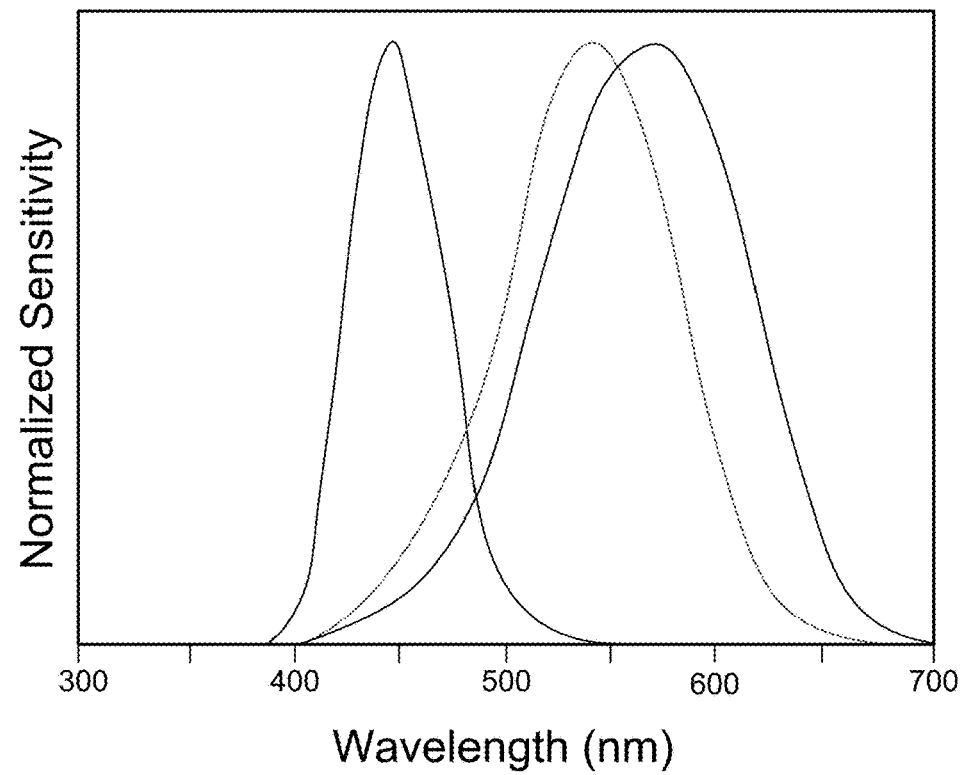
FIG. 2B depicts the spectral sensitivity for humans over a range of wavelengths.

FIG. 2A presents a graph showing the spectral sensitivity for a typical UVS bird, a Eurasian blue tit (cyanistes caeruleus), with each peak relating to one of the four types of cones in a bird eye. This graph is adapted from FIG. 1 of the Ödeen/Håstad paper mentioned above. FIG. 2B presents a graph showing the spectral sensitivity for a typical human, with each peak relating to one of the three types of cones in a human eye. Together, FIGS. 2A and 2B illustrate that birds are capable of seeing wavelengths that are below wavelengths viewable by humans. The range between about 300-400 nm is particularly relevant, with bird vision being much better than human vision in this range. The bird cone capable of seeing into UV has a peak around 370 nm. As such, patterns or other modifications that make the window visible/noticeable at a wavelength range between about 320-390 nm, or between about 350-385 nm, or between about 360-380 nm may be particularly useful. In some embodiments, the pattern or other modification makes the window visible/noticeable at wavelengths under about 400 nm, or at wavelengths under about 390 nm, or at wavelengths under about 380 nm. The wavelengths over which the pattern or other window modification is noticeable may be within the range of wavelengths that corresponds to UVA (between about 315-400 nm) and/or UVB (between about 280-315 nm). Wavelengths in UVA may be most useful, based on the data summarized in FIG. 2A.

Pattern Design Considerations

In certain embodiments, a window may include a pattern that is visible to birds. The pattern may be positioned in a number of places. In some cases, the pattern is disposed on an electrochromic pane. An electrochromic pane includes a transparent substrate with an electrochromic device coating thereon. Typically, the electrochromic device is provided on one surface of the pane, but in some cases an electrochromic device is provided on both primary surfaces (the interior facing surface and the exterior facing surface) of a particular pane. In some embodiments, the electrochromic pane is provided in an assembly having two or more panes such as an insulated glass unit or a laminate of two or more panes. That is, a non-electrochromic pane may be paired with an electrochromic pane in an IGU in some cases. A non-electrochromic pane may also be laminated to an electrochromic pane in some cases. An IGU may include such laminate(s) or no laminates. A bird-visible pattern may reside on an electrochromic pane, a non-electrochromic pane, or both.

Various embodiments herein relate to techniques where the patterned layer is provided on the interior of an IGU or a laminate (i.e., the patterned layer is positioned at some location between two panes). A patterned layer may also be provided outside of two panes in an IGU in certain embodiments (e.g., on an exterior-facing outer pane (often referred to as surface 1) or on an interior-facing inner pane (often referred to as surface 4), or on an additional layer/substrate that may be attached (e.g., laminated) onto surfaces 1 or 4. In many embodiments, a patterned layer may be provided on the same pane as an electrochromic device. In other words, an electrochromic pane may be patterned to be bird friendly. The patterning may be on the surface with the EC coating or the surface without the EC coating, or both. In these or other embodiments, a patterned layer may be provided on a non-electrochromic pane. The patterned, non-electrochromic pane may be associated with an electrochromic pane in an IGU, or laminated to an electrochromic pane as mentioned above.

In various embodiments, an electrochromic device may be fabricated to include a defect-mitigating-insulating layer (DMIL), also referred to as a buffer layer. The buffer layer may be provided, at least in part, to minimize the risk of fabricating defective devices by preventing a short circuit within the electrochromic device. The buffer layer may be patterned such that birds can recognize the window as something they cannot fly through, while still maintaining a clear view for human occupants. One example buffer layer/DMIL is shown in FIG. 1 as element 105. Buffer layers may also be provided at various other locations in an electrochromic device, as described herein. Buffer layers/DMILs are further discussed and described in U.S. Pat. No. 9,007,674, which is herein incorporated by reference in its entirety. In various embodiments, a buffer layer may have an electronic resistivity between about 1 and $5\times10^{10}$ Ohm-cm. One example of a buffer layer material that can be patterned is titanium oxide, though the embodiments are not so limited. Titanium oxide DMILs are beneficial regardless of whether such layers are patterned for bird-friendliness.

In various embodiments, the patterned layer may include a material that has different optical properties at (a) a wavelength (or range of wavelengths) visible by birds, compared to (b) wavelengths visible by humans. For instance, the patterned layer may include a material that has a high reflectance in UV and a low reflectance in the range of wavelengths visible by humans. This material may form one pattern element that contrasts with a second pattern element that may be effectively invisible to both birds and humans, thereby defining a pattern that is perceivable by birds but not humans.

In some embodiments, the patterned layer may include an oxide material (or nitride or carbide material in some embodiments), for example a metal oxide. In some cases, the patterned layer may include a material that exhibits different optical properties (e.g., refractive index/reflectance/transmissivity/scattering/etc.) depending on its thickness. In a particular example, the patterned layer is titanium oxide ($TiO_x$), which has a higher index of refraction at UV wavelengths than at wavelengths visible by humans. Advantageously, the thickness of the $TiO_x$ affects how light interacts with the $TiO_x$, and a layer of $TiO_x$ can be patterned to different thicknesses to achieve a pattern perceivable by birds but not by humans. In such embodiments, one pattern element may be made of relatively thinner $TiO_x$, and a second pattern element (which contrasts with the first pattern element) may be made of relatively thicker $TiO_x$. Other examples of materials that may behave similarly include, but are not limited to, various oxides, nitrides, and carbides, including but not limited to aluminum oxide, tantalum oxide, tin oxide, silicon oxide, aluminum nitride, and silicon nitride. In some cases a patterned layer will act as a DMIL/buffer layer, or as a portion thereof. In some other cases, a patterned layer may be shaped and/or located at a position that would render it unsuitable as a DMIL (e.g., the layer may include incomplete coverage of TiOx or other DMIL material, or it may be positioned outside the pair of conductive layers, for instance between a glass substrate and a conductive layer). Further, the patterned layer may be made of a material that is not suitable as a DMIL (e.g., the patterned layer may be of the same material as a DMIL, or not, and may or may not be sufficiently insulating to act as a DMIL).

In various implementations, a material used for a patterned layer may have certain properties. For example, the material may be substantially transparent in UV (e.g., between about 300-400 nm, in some cases below about 350 nm). The material may have an index of refraction that is different from that of the substrate. In many cases, the material used for a patterned layer has a difference in n and/or k values between the UV region (e.g., between about 300-400 nm) and the human visible region (e.g., between about 400-700 nm). These n and k values relate to the refractive index of the material.

Techniques for creating a bird-visible pattern are discussed further below. Briefly, the pattern produces contrasts between two or more pattern features, particularly where such contrasts occur at wavelengths in the UV spectrum. The pattern features include at least two components that contrast with one another (selectively to birds). For instance, with respect to a chess board, the pattern features include both the black squares (which may be considered first features) and the white squares (which may be considered second features). With respect to an empty tic-tac-toe board, the pattern features include the black lines (which may be considered first features) and the white spaces (which may be considered second features) between the lines. With respect to a patterned window that includes at least two contrasting properties, the pattern features include both the areas having a first property (e.g., a first refractive index in UV) and the areas having a second property (e.g., a second refractive index in UV).

In a number of cases, the pattern has certain characteristics to discourage birds from trying to fly through the window. For instance, the pattern may have particular dimensions so that a bird will think they cannot fit through spaces in the pattern. It has been observed that small birds will not fly through surfaces that have two inches or less of untreated horizontal space or four inches or less of untreated vertical space. In other words, a bird will not try to fly through a vertically oriented "opening" if the opening appears to be less than about four inches wide, nor will it try to fly through a horizontally oriented "opening" if the opening appears to be less than about two inches tall. The "opening" perceived by the bird is a portion of the glass itself, and is not actually an opening.

Figure 3A:
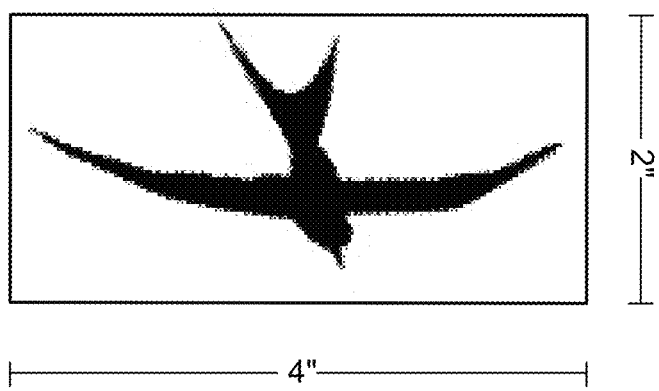
FIG. 3A illustrates a gap through which a small bird can fly.

FIG. 3A illustrates the minimum height and minimum width of an area through which a typical small bird will fly. If a bird perceives that a gap is thinner than about 4 inches wide and/or shorter than about 2 inches tall (or vice versa), it will generally recognize the gap as too small to fit through, and will not try to fly through the gap. As such, in various embodiments, a window may be patterned such that the pattern features are shorter than about 2 inches tall (e.g., shorter than about 1.75 inches tall, or shorter than about 1.5 inches tall) and/or thinner than about 4 inches wide (e.g., thinner than about 3.5 inches wide, or thinner than about 3 inches wide). In some embodiments, the smallest linear dimension of one or more pattern features (in some cases all pattern features) may be about 4 inches or less, or about 2 inches or less. Such dimensions may refer to all pattern elements, or only to pattern elements which a bird might perceive to be an opening through which it can fly. In one example, a pattern may be made of two contrasting pattern elements including one pattern element that a bird perceives as an opening and one pattern element that a bird perceives as solid. The pattern element that appears to be an opening may have the dimensions listed in this paragraph, while the other pattern element which appears to be solid may or may not have the dimensions listed in this paragraph.

Further, in some embodiments, the pattern features may be greater than about 0.25 inches tall and wide to help ensure that the birds can see the pattern. In various embodiments, the smallest dimension of a pattern feature may be at least about 0.25 inches. If the pattern features are smaller than 0.25 inches, the bird may not see the pattern feature until it is too close to the window to avoid collision (if the bird sees the pattern at all). However, certain patterns may have pattern features that fall outside the guidelines presented above. For instance, in some cases the pattern features may be shorter than 2 inches tall, thinner than about 4 inches wide, and/or smaller than about 0.25 inches tall/wide.

Figure 3B:
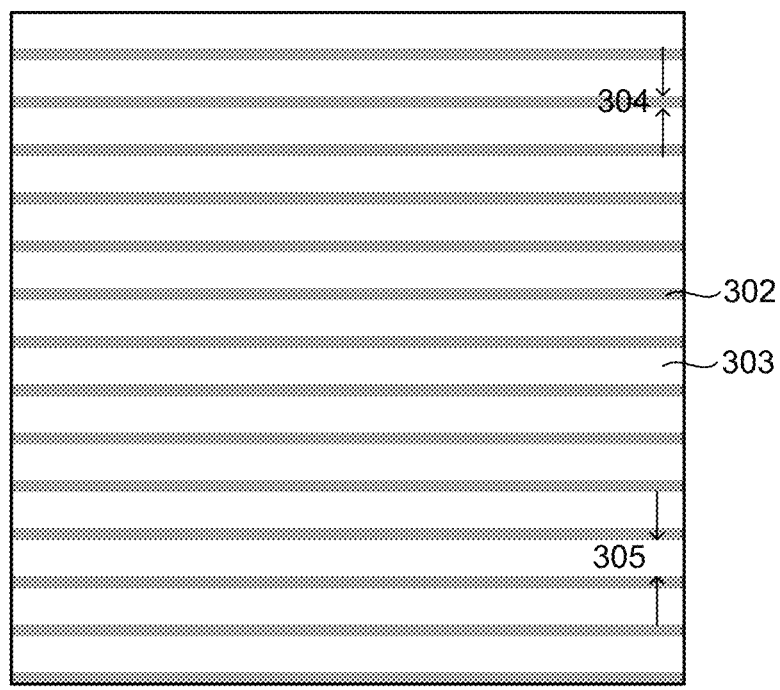
FIGS. 3B-3H show various patterns that may be used when designing a patterned bird friendly window according to certain embodiments.

FIGS. 3B-3H illustrate various patterned windows according to certain embodiments. In FIG. 3B, the pattern includes horizontal stripes 302 and gaps 303. The stripes 302 and gaps 303 are both considered to be pattern features. For instance, the horizontal stripes 302 may be considered a first pattern feature and the gaps 303 may be considered a second pattern feature. The stripes 302 contrast with the gaps 303. For instance, the stripes 302 may have different reflectance values or scattering properties than the gaps 303, particularly and selectively in the UV range. As understood by those of skill in the art, reflectance values can be controlled by adjusting refractive index. Certain dimensions are labeled in FIG. 3B. In particular, dimension 304 is the height of the stripes 302, and dimension 305 is the height of the gaps 303. In various embodiments, either or both of dimensions 304 and 305 may be at least about 0.25 inches tall, and shorter than about 2 inches. Where dimensions 304 and/or 305 are greater than 2 inches, a small bird may perceive that it can fly through either the stripe 302 or the gap 303, depending on the optical properties of the stripe 302 and gap 303. Dimensions 304 and/or 305 may be uniform or non-uniform throughout the window. In other words, various stripes 302 and/or gaps 303 may have different and/or varying heights in some cases. Further, dimension 304 may be smaller, larger, or about equal to dimension 305.

Figure 3C:
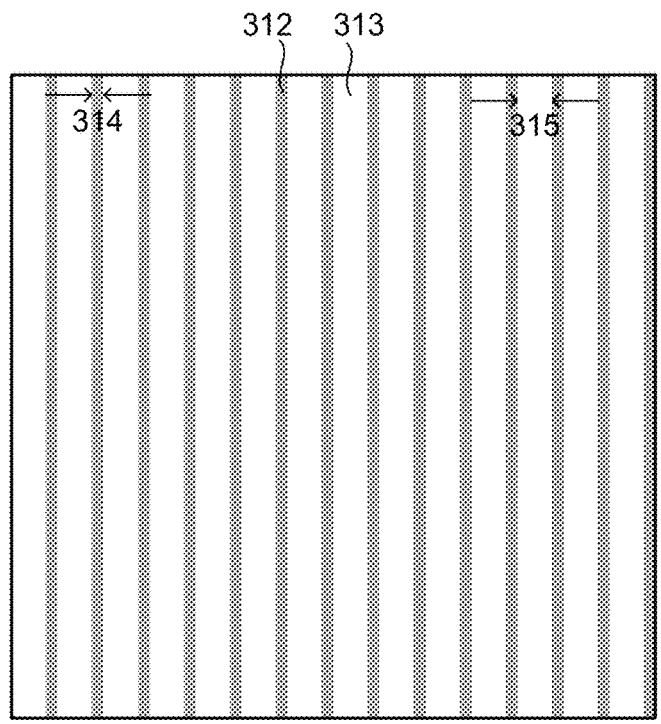

FIG. 3C illustrates a patterned window where the pattern includes a series of vertical stripes 312 and gaps 313. The vertical stripes 312 may be considered a first pattern feature and the gaps 313 may be considered a second pattern feature. As noted above with respect to FIG. 3B, the stripes 312 contrast with the gaps 313, selectively in the UV range. For example, the stripes 312 may have different refractive indices or scattering properties compared to the gaps 313. Certain dimensions are labeled in FIG. 3B including dimension 314, which is the width of the stripes 312, and dimension 315, which is the width of the gaps 313. In certain embodiments, dimensions 314 and/or 315 are at least about 0.25 inches wide, and less than about 4 inches wide. Dimensions 314 and 315 may be uniform or non-uniform throughout the window. As such, various stripes 312 and/or gaps 313 may have different and/or varying widths. Dimension 314 may be smaller, larger, or about equal to dimension 315.

Figure 3D:
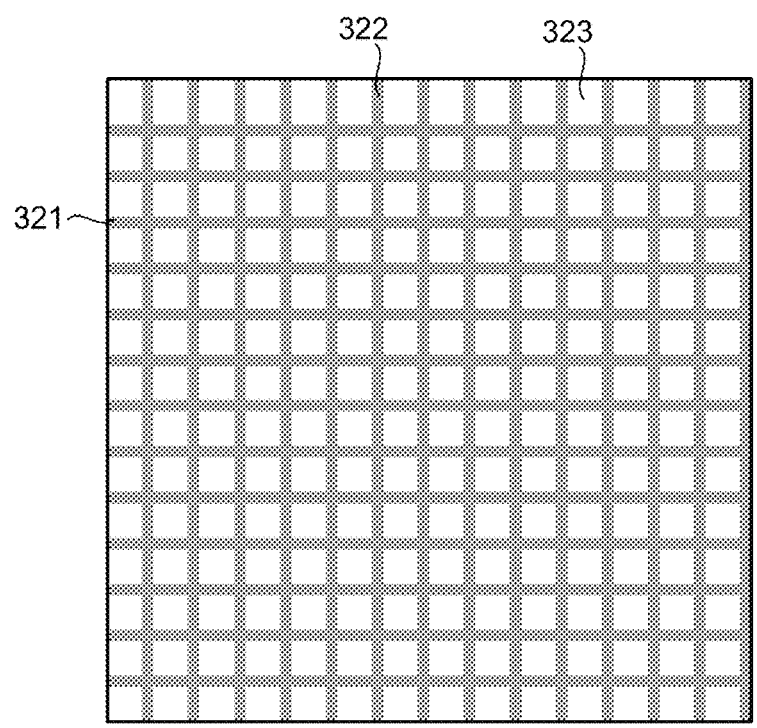

FIG. 3D illustrates a patterned window where the pattern includes a series of horizontal stripes 321, vertical stripes 322, and gaps 323. The horizontal and vertical stripes 321 and 322, respectively, may be considered a first pattern feature and the gaps 323 may be considered a second pattern feature. The dimensions of the stripes 321 and 322 and gaps 323 may be as described above. The stripes 321 and 322 contrast with the gaps 323. For instance, the stripes 321 and 322 may have a reflectance value and/or scattering properties than the gaps 323, particularly and selectively in the UV range.

Figure 3E:
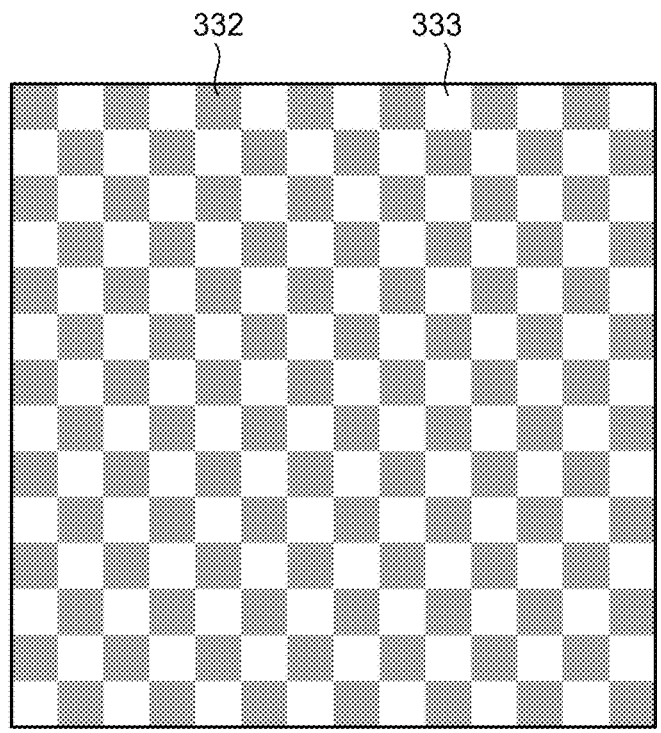

FIG. 3E illustrates a patterned window where the pattern includes alternating blocks 332 and 333 that have contrasting properties. Blocks 332 may be considered a first pattern feature and blocks 333 may be considered a second pattern feature. In various cases the blocks 332 and 333 may have different reflectance values (as set by, e.g., refractive indices), scattering coefficients, etc. selectively in the ultraviolet region where bird visual perception is significantly stronger than human visual perception. The dimensions of the blocks 332 and 333 may fall within the dimensions listed above.

Figure 3F:
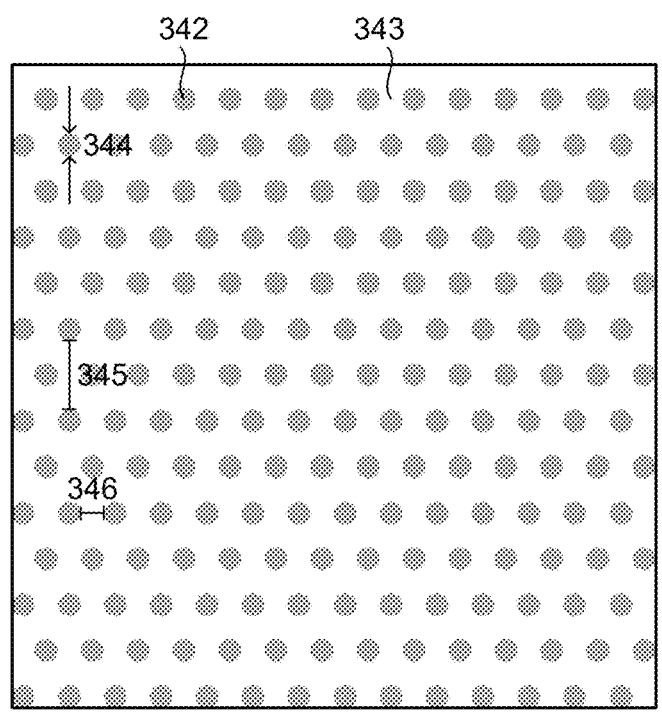

FIG. 3F illustrates a patterned window where the pattern includes a series of dots 342 and space 343 between the dots. The dots 342 may be considered a first pattern feature and the space 343 may be considered a second pattern feature. The dots 342 contrast with the space 343. For example, the dots 342 may have a reflectance value and/or scattering properties than the space 343. Such contrast may be selectively in the UV range of wavelengths. Certain dimensions are shown in FIG. 3F including dimension 344, which is the diameter of the dots 342, dimension 345, which is the height of the vertical space between dots 342 that are in the same column, and dimension 346, which is the width of the horizontal space between dots 342 that are in the same row. The dots may in some cases have a diameter, dimension 344, that is at least about 0.25 inches. Dimension 345 may fall within the vertical dimensions listed above, for example less than about 2 inches. Dimension 346 may fall within the horizontal dimensions listed above, for example less than about 4 inches. In some embodiments, the dots may be of varying sizes. Further, the dots may be oriented in a less regular pattern. In further embodiments, the dots may not be circular dots, but rather any shapes, regular or irregular, and mixtures of shapes are contemplated.

Figure 3G:
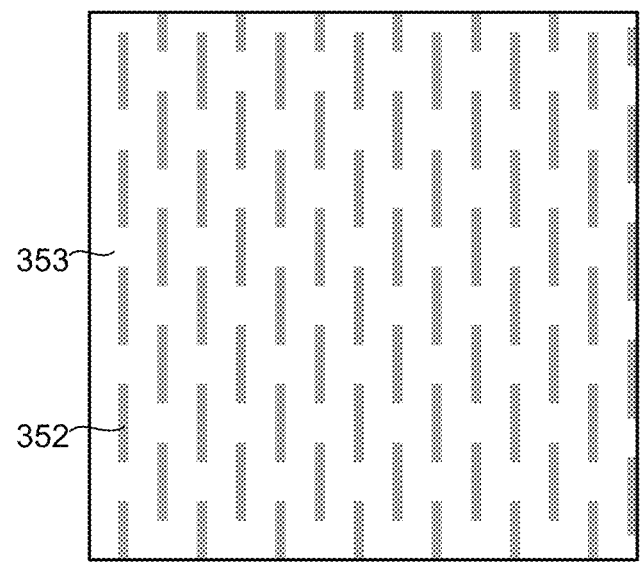

FIG. 3G illustrates a patterned window where the pattern includes a series of short vertically oriented bars 352 and space 353 between the bars. The bars 352 may be considered a first pattern feature and the space 353 may be considered a second pattern feature. The bars 352 contrast with the space 353. In various embodiments, the bars 352 may have a different reflectance value and/or scattering properties than the space 353. The bars 352 may have a minimum width and length of about 0.25 inches in various embodiments. The bars 352 may have a particular length to width aspect ratio, for example at least about 2:1, at least about 3:1, at least about 5:1, at least about 10:1, or at least about 20:1. Further, the space 353 between the bars 352 may in any given area have a local vertical dimension of less than about 2 inches and/or a local horizontal dimension of less than about 4 inches. The pattern in FIG. 3G is similar to the pattern in FIG. 3C, except that the stripes are provided as discontinuous bars. In FIG. 3G, the bars in different columns are offset from one another such that bars in one column overlap vertically with bars in an adjacent column (though such bars remain horizontally separated in different columns, as shown). In another embodiment, the bars are aligned with one another such that the bars in one column do not overlap with bars in an adjacent column. In another embodiment, the bars may be oriented horizontally. Such an embodiment would be similar to that shown in FIG. 3B, except that the stripes would be discontinuous. In these embodiments, the bars may be offset from one another such that bars in adjacent rows overlap with one another horizontally (though such bars would remain vertically separated in different rows), or the bars may be aligned such that bars in one row do not overlap bars in an adjacent row.

Figure 3H:
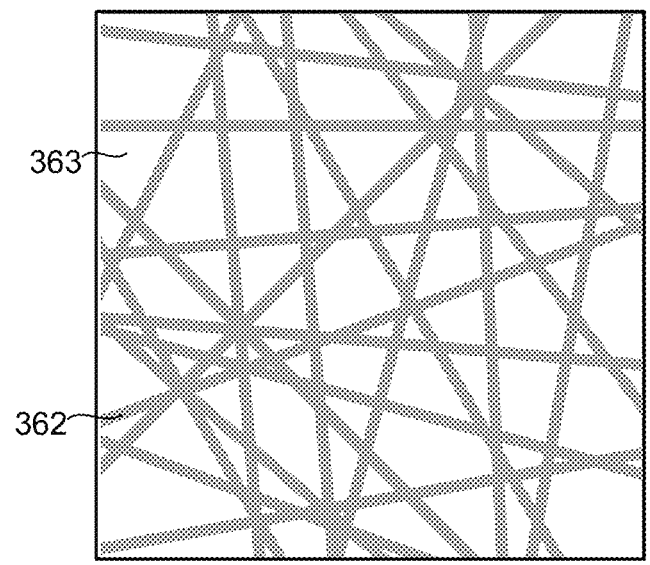

FIG. 3H presents a patterned window where the pattern includes a series of randomly oriented stripes 362 with space 363 between the stripes 362. The stripes 362 may be considered a first pattern feature and the spaces 363 may be considered a second pattern feature. A random orientation of stripes or other shapes can be useful, particularly where the spaces 363 (and/or stripes 362) are each individually about 2 inches or less vertically and/or about 4 inches or less horizontally.

The patterns shown in FIGS. 3B-3H are merely examples. Those of ordinary skill in the art would appreciate that many patterns are available and within the scope of the disclosed embodiments.

In certain embodiments, the patterned layer is integrated with a series of layers in a stack that provides areas of constructive and/or destructive interference over the face of the glass, particularly over the UV range. Such interference may define the pattern seen by a bird. Factors that may contribute to formation of such interference include the material(s) used to fabricate the pattern, the refractive index of such materials, as well as the thickness of such materials. The constructive/destructive interference may be strong in the UV spectrum visible by birds and weak in the spectrum visible by humans. In some embodiments, the stack of materials is engineered to produce controlled regions of interference. Material properties relevant to producing this interference include the n vs. K behavior, and/or the k vs. K behavior of the material.

In various embodiments, a pattern may be discernable but not particularly noticeable by humans. In other words, humans may be able to see the pattern if they are looking closely and/or carefully, but would not otherwise be likely to notice the pattern.

Methods of Patterning an Electrochromic Window

While non-electrochromic windows can be modified to be bird friendly, electrochromic windows present an opportunity to use electrochromic device components to assist in presenting patterns selectively visible to birds. In particular, because electrochromic windows are fabricated to include a number of different layers (many of which are transparent thin films, and many of which are all solid-state and inorganic), one or more of these layers can be patterned to make the window visible to birds. Some of the layers that can be so patterned are not present in typical non-electrochromic windows.

As noted above, a pattern includes at least two contrasting components selectively visible to birds. Such components may be referred to as features or pattern features. A first component of the pattern may be effectively invisible to both birds and humans, while a second component of the pattern may be visible only to birds and invisible to humans. This results in a pattern that is perceivable by birds but invisible to humans. Put another way, the pattern may be formed to include a first component that (a) contrasts with a second component, such that the pattern formed from the first and second components is perceivable, and (b) exhibits different optical properties at UV vs. human visible wavelengths, such that the pattern formed from the first and second components is perceivable at UV wavelengths visible to birds, but not at wavelengths visible by humans.

In various embodiments, the refractive index may be different between the two contrasting components at a wavelength that is visible by birds but not humans. When used without qualification herein, the refractive index is intended to refer to the complex refractive index. The complex refractive index (n) can be defined in terms of its real part (n), which indicates the phase velocity, and its imaginary part (K), which indicates the extinction coefficient or mass attenuation coefficient. In particular, $\underline{n}=n+1K$.

In some embodiments, the contrasting components of the pattern are made of materials that have n values that differ by at least about 0.3 at a UV wavelength visible by birds (but not humans). In these or other embodiments, the contrasting components of the pattern may have K values that differ by at least about 0.01 at a UV wavelength visible by birds (but not humans). In these or other embodiments, the contrasting components of the pattern may have n values that differ by about 0.1 or less at wavelengths in the range between about 400-700 nm, and/or K values that differ by about 0.005 or less at wavelengths in the range between about 400-700 nm. In one example, a pattern is made of a first component and a second component. The first and second components may be stripes and gaps, respectively, as shown in FIG. 3B for example. The first component (e.g., stripes 302 in FIG. 3B) may be visible to birds and invisible to humans, while the second component (e.g., gaps 303 in FIG. 3B) may be invisible to both birds and humans. Because the first component/stripes 302 exhibit different optical properties at UV wavelengths compared to wavelengths visible by humans, and because the first component/stripes 302 contrast with the second component/gaps 303 at UV wavelengths, the pattern is perceivable by birds but not humans.

The reflectance (R) of a material is controlled by the refractive index of the material. Specifically, $R=((n-1)/(n+1))^2$. In some embodiments, the contrasting components of the pattern have reflectances that differ by at least about 5%, in some cases at least about 15% at wavelengths between about 300-400 nm, or between about 350-400 nm, for example at about 370 nm. Such reflectance differences may not be visible by humans, for example where the reflectance differences are below a human perceivable threshold in the range between about 400-700 nm.

In various embodiments, the contrasting components of the pattern may have different reflection properties, scattering properties, absorption properties, transmission properties, etc.

Layers for Patterning

A number of different layers in or on an electrochromic window can be patterned to provide contrasting components that make the window visible to birds. As noted above, a patterned layer may be provided on an electrochromic pane and/or on a non-electrochromic pane. If a patterned layer is provided on a non-electrochromic pane, it may be provided together with an electrochromic pane, for example in an IGU and/or in a laminate structure. Similarly, a patterned electrochromic pane may be provided in an IGU and/or in a laminate structure as desired. The patterned layer may be provided on any surface of an IGU, and in some cases is provided between the panes of the IGU. In one example where the patterned layer is provided on the interior of an IGU, the patterned layer also acts as a defect-mitigating insulating layer, as described above.

In some embodiments, the patterned layer is provided next to a substrate layer. In one example, the pattern is formed directly on the substrate. The patterned layer may be positioned such that it is closer to the outside environment than the substrate, or vice versa. A protective cover may be provided (e.g., laminated or otherwise formed) on the patterned layer to protect it from damage.

The patterned layer should be positioned such that the pattern is perceivable by birds. Placing the pattern closer to the bird and farther away from the interior of the building may help make the pattern more perceivable by the birds.

For reference, in an IGU having two panes, the exterior-facing surface of the exterior pane is typically referred to as S1, the interior-facing surface of the exterior pane is referred to as S2, the exterior-facing surface of the interior pane is referred to as S3, and the interior-facing surface of the interior pane is referred to as S4. In other words, going from the external environment inwards, the surfaces are referred to as S1, S2, S3, and S4, with S4 being the surface that a building occupant can physically touch, and S1 being the surface exposed to the outside environment. Surfaces that are relatively closer to the external environment are referred to as "outboard" surfaces, while surfaces that are relatively closer to the interior of the building are referred to as "inboard" surfaces. For example, S1 is outboard of S2, S3, and S4.

When an IGU is provided with a single electrochromic pane, the electrochromic pane can be the interior pane (having surfaces S3 and S4) or the exterior pane (having surfaces S1 and S2). The electrochromic device can be positioned on any of surfaces S1-S4. One benefit of including an electrochromic device on S1 and/or S2 is that the solar heat gain through the window can be minimized. An electrochromic device can absorb solar energy and become fairly warm. When the electrochromic device is provided on S1 and/or S2, the warm electrochromic device is on the outboard lite, and any argon (or other gas) provided interior of the IGU can act as a thermal barrier to minimize the amount of heat that enters the building as a result of the warm electrochromic device.

In some other embodiments, the electrochromic device may be provided on S3 and/or S4. In these implementations, the solar heat gain through the window may be relatively higher due to the fact that the interior pane of the IGU will become warm, thereby heating the building interior to a greater extent. Without the IGU's internal gas pocket to act as a thermal barrier between the electrochromic device and the interior of the building, the heat gain through the windows may be relatively higher. However, this may be mitigated by using a triple-pane IGU, having surfaces S1-S6 (in this example, S6 is the surface which a building occupant can physically touch), where the EC device is on S3 or S4, and yet, there is still an inert gas barrier between the warm EC device and the interior of the building due to the presence of the third pane with surfaces S5 and S6. Thus one embodiment is a triple pane IGU having one or more bird friendly features on S1 and/or S2, and one or more EC device on S3 and/or S4. Triple pane IGU embodiments are further discussed below in the context of FIGS. 4M-4X.

Another way to combat the heat gain through the window is to use a low-emissivity coating outboard of the electrochromic device. This strategy is particularly effective where the low-emissivity coating reduces the amount of infrared energy that passes through the window onto an EC coating, for example an EC coating on S3 and/or S4 (or otherwise inboard of the low-emissivity coating). The low-emissivity coating may block (e.g., reflect) a relatively higher degree of IR energy and a relatively lower degree of UV energy in some cases, thereby permitting the electrochromic device to be located on S3 or S4, and ensuring that the patterned layer remains visible to the birds outside (regardless of where the patterned layer is located). In various embodiments, a low-emissivity coating may be provided on S1 and/or S2, though such a coating can be provided anywhere on the IGU. The low-emissivity coating may be provided on the same or different surface as the patterned layer. The low-emissivity coating may also be provided on the same or different surface as the electrochromic layer. So long as the low-emissivity coating is outboard of the electrochromic layer, heat gain through the window related to heating of the electrochromic device itself can be minimized. In a particular embodiment, the patterned layer is outboard of a low-emissivity coating, which is outboard of the electrochromic device. Many other configurations are possible.

In certain embodiments, the reduction in heat gain efficiency related to having the electrochromic device on S3 or S4 may be offset by other factors, making placement of the electrochromic device on S3 and/or S4 more attractive. In some embodiments, it is beneficial to have the electrochromic device provided on the interior of the IGU, on S2 and/or S3. This structure ensures that the electrochromic device is protected from the elements. Alternatively or in addition, an electrochromic device may be provided on the outer surfaces of the IGU, e.g., on S1 and/or S4, as desired for a particular application. Where this is the case, a protective layer may be provided over the electrochromic device to protect the electrochromic device from damage. One such protective layer, e.g., if the EC device is on S4, can be an additional inboard lite, either laminated to S4 or provided with an inert gas barrier and spacer between S4 and the additional lite to form a triple pane IGU as described above.

With respect to the relative position of the patterned layer and the electrochromic device, a number of possibilities are available. In some embodiments, the patterned layer is positioned closer to the exterior environment and the electrochromic layer is positioned closer to the building interior (i.e., the patterned layer is outboard of the electrochromic device). This configuration may be beneficial in that the pattern on the patterned layer will be visible to birds regardless of the optical state of the electrochromic device. Because the electrochromic device is not positioned between the bird and the patterned layer in these examples, the electrochromic device can't prevent the bird from seeing the patterned layer. In the examples of FIGS. 4A-4L, an IGU includes a first lite 402*a* and a second lite 402*b*, with an electrochromic stack 420 and a patterned layer 405 provided somewhere in/on the IGU. In the examples of FIGS. 4M-4X, the IGUs further include a third lite 402*c*, thereby forming triple paned IGUs. The lites 402*a*-402*c* and other layers are shown extending into/out of the page, and only a portion of the IGU is shown (e.g., spacers, frames, and other components are omitted). As used in relation to FIGS. 4A-4X, an electrochromic stack 420 (sometimes also referred to as an electrochromic device, electrochromic coating, etc.) may refer to an entire electrochromic device including, e.g., a first conductive layer, a cathodically coloring electrochromic layer, an optional ion conducting layer, an anodically coloring (or optically passive) counter electrode layer, and a second conductive layer. However, the electrochromic stack 420 may also refer to a more limited portion of the electrochromic stack including just the cathodically coloring electrochromic layer, the optional ion conducting layer, and the anodically coloring (or optically passive) counter electrode layer, with the location of the conducting layers not being specified but understood to be in functionally appropriate locations. Other layers (e.g., defect mitigating layers, low-emissivity coatings, etc.) may also be present.

Figure 4A:
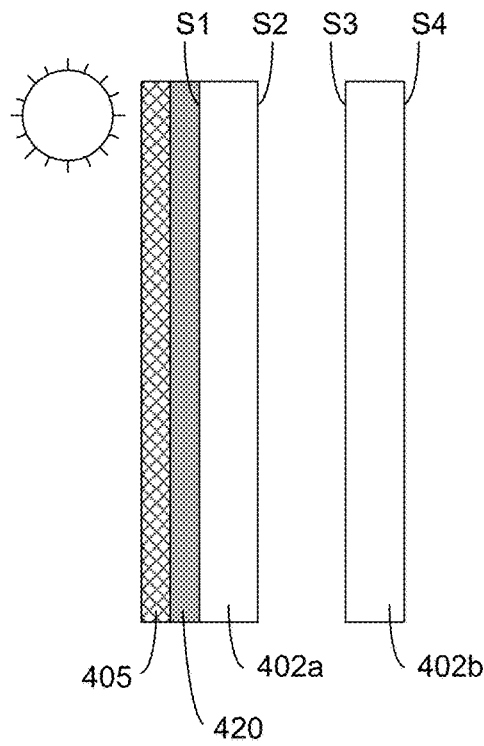
FIGS. 4A-4L present various embodiments of a bird friendly electrochromic window having a patterned layer and an electrochromic stack positioned at various locations.
Figure 4B:
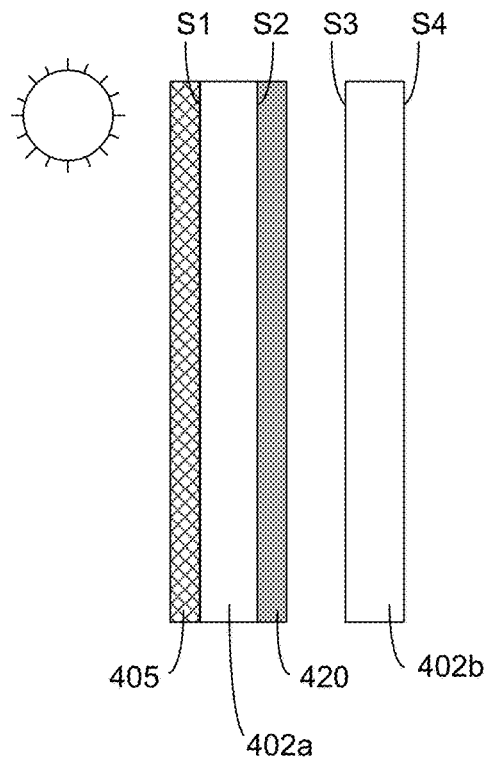
Figure 4C:
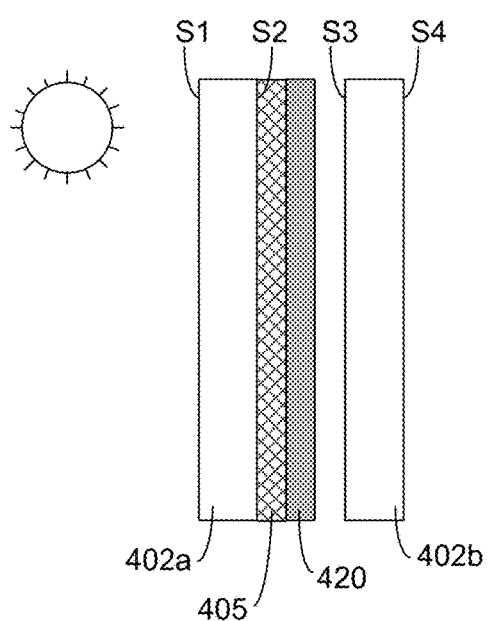

In the example of FIG. 4A, both the patterned layer 405 and the electrochromic stack 420 are provided on S1, with the patterned layer 405 provided on top of the electrochromic stack 420 (and therefore outboard of the electrochromic stack 420). In another example, the patterned layer 405 is provided on S1, and the electrochromic stack 420 is provided on any one or more of S2, S3, and S4. FIG. 4B illustrates an example where the patterned layer 405 is on S1 and the electrochromic stack 420 is on S2. In another example, the patterned layer 405 is provided on S1 and/or S2, and the electrochromic stack 420 is provided on S2, S3, and/or S4, with the patterned layer 405 being positioned outboard of the electrochromic stack. FIG. 4C illustrates an example where both the patterned layer 405 and the electrochromic stack 420 each provided on S2, with the patterned layer 405 outboard of the electrochromic stack 420.

Figure 4D:
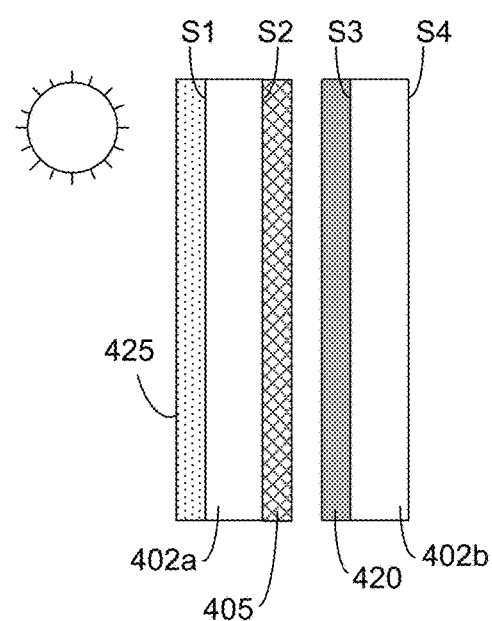
Figure 4E:
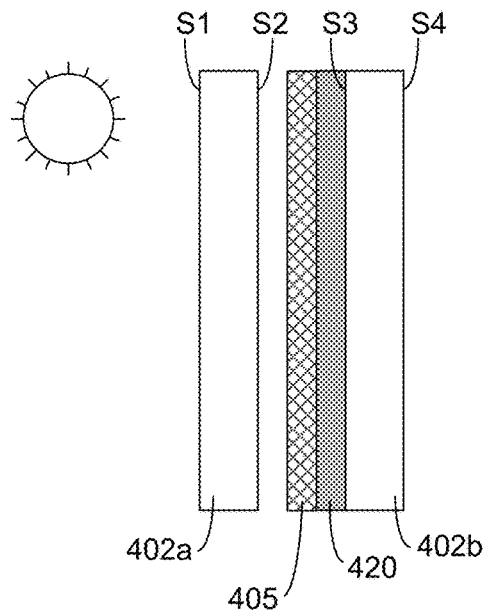
Figure 4F:
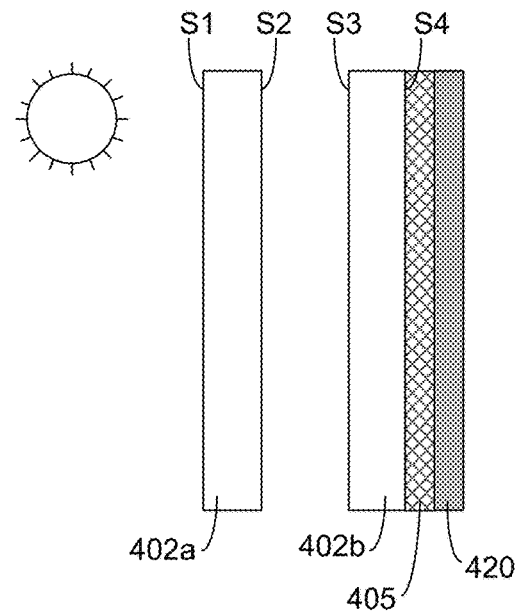
Figure 4G:
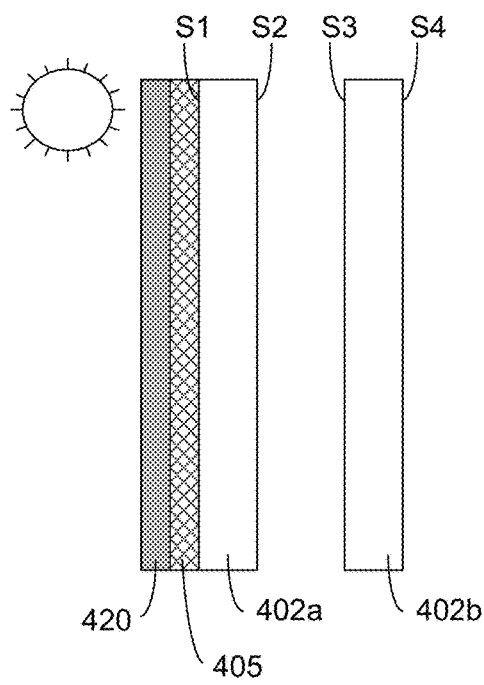
Figure 4H:
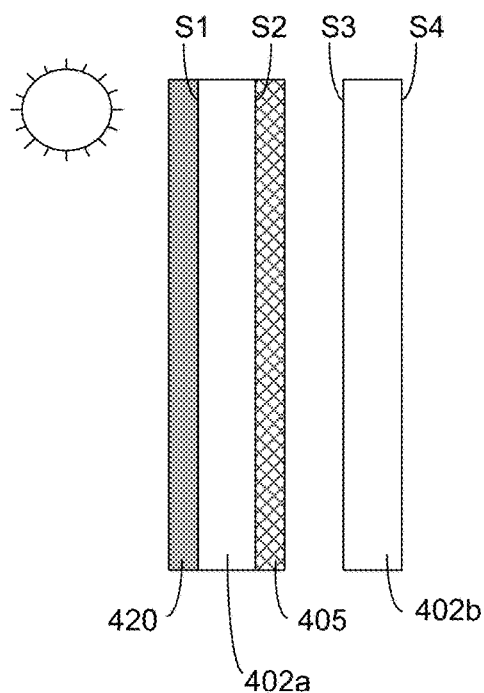
Figure 4I:
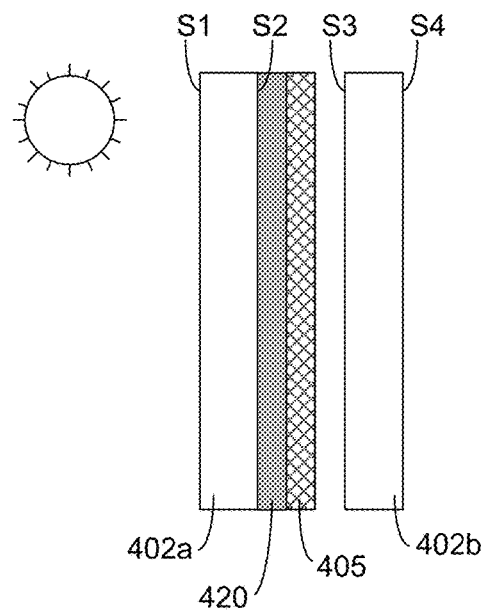

In another embodiment, the patterned layer 405 is provided on S1 and/or S2, and the electrochromic stack 420 is provided on S3 and/or S4. FIG. 4D provides one such example, showing the patterned layer 405 on S2 and the electrochromic stack 420 on S3. FIG. 4D also shows a low-emissivity coating 425 positioned on S1. As stated above, a low-emissivity coating may be provided at a number of locations, often but not necessarily outboard of an electrochromic layer. In a particular embodiment, the patterned layer is provided on S1 and/or S2, and the electrochromic device is provided on S3. In another embodiment shown in FIG. 4E, both the patterned layer 405 and the electrochromic stack 420 are provided on S3, with the patterned layer 405 being positioned outboard of the electrochromic stack 420. In another embodiment, the patterned layer 405 may be provided on S1, S2, and/or S3, and the electrochromic stack 420 is provided on S4. In yet another embodiment, both the patterned layer 405 and the electrochromic stack 420 may be provided on S4, with the patterned layer 405 being positioned outboard of the electrochromic stack 420, as shown in FIG. 4F. In various embodiments, each of the patterned layer 405 and the electrochromic stack 420 may be provided on any one or more of S1, S2, S3, and S4, with the patterned layer 405 being provided outboard of the electrochromic stack 420. Only some of the listed configurations are shown explicitly in the figures, though all disclosed configurations are considered to be within the scope of the present embodiments.

FIGS. 4A-4F present embodiments where the patterned layer 405 is positioned outboard of the electrochromic stack 420. In other embodiments, for example as shown in FIGS. 4G-4L, these relative positions may be reversed such that the patterned layer 405 is inboard of the electrochromic stack 420. In some such embodiments, there is a risk that when the electrochromic stack 420 is in a relatively more tinted state, the tinted electrochromic device will prevent a bird flying outside from seeing/perceiving the patterned layer (since the electrochromic device is outboard of the patterned layer and can therefore block the patterned layer from the bird's perspective).

This risk is minimized when the electrochromic device's available optical states render the electrochromic window either (a) sufficiently opaque/tinted (or other optical characteristic) such that the bird can perceive the presence of the window, or (b) transparent in the human-visible spectrum, but patterned in the UV spectrum such that the bird can perceive the presence of the window. In (a), the window may be sufficiently dark that a bird perceives it as a wall or other structure that can't be flown through. In (b), the window may appear clear to humans, but patterned to birds, such that the birds won't try to fly through the window. In a number of embodiments, an electrochromic window is configured to achieve two or more optical states, each of which achieve at least one of (a) or (b). In certain embodiments, an electrochromic window is configured to achieve a three or more optical states, with one (or more) optical state achieving (b) and the remaining optical states achieving (a). In a particular example, an optical device is configured to achieve three optical states including a first state that appears transparent to humans and patterned to birds, a second state that appears moderately tinted to both humans and birds, and a third state that appears highly tinted to both humans and birds. In each of the second and third state, the window is sufficiently dark and perceptible such that birds do not try to fly through the window. The reflectivity, transmissivity, and other optical properties of the window can be tuned to ensure this result, for example by providing one or more anti-reflective coatings on the electrochromic window (e.g., on S1 or another surface). This technique can be applied regardless of the relative positions of the patterned layer and the electrochromic stack, though it may be most beneficial in cases where the electrochromic stack is outboard of the patterned layer.

Figure 4J:
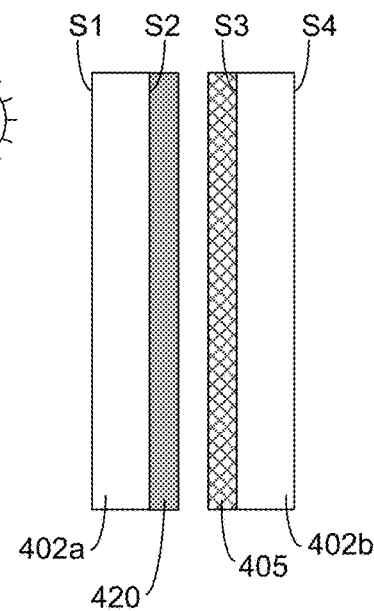
Figure 4K:
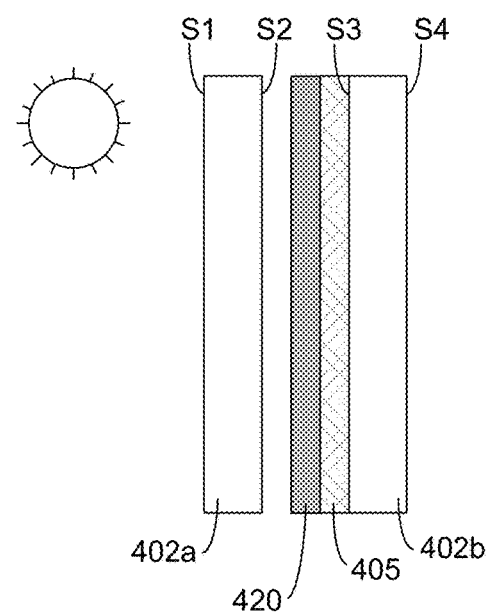
Figure 4L:
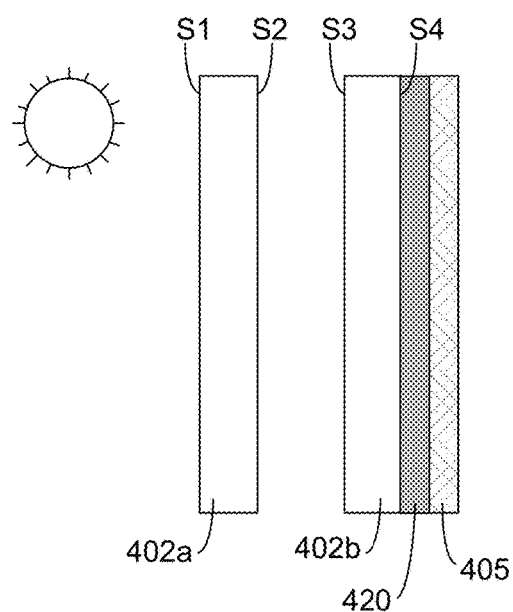
Figure 4M:
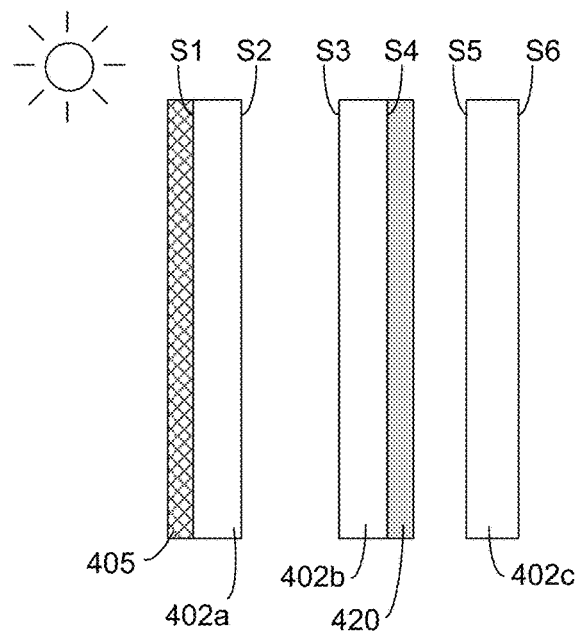
FIGS. 4M, 4N, 4P, 4Q, and 4R depict embodiments of triple paned bird friendly electrochromic windows having a patterned layer and an electrochromic stack positioned at various locations.
Figure 4N:
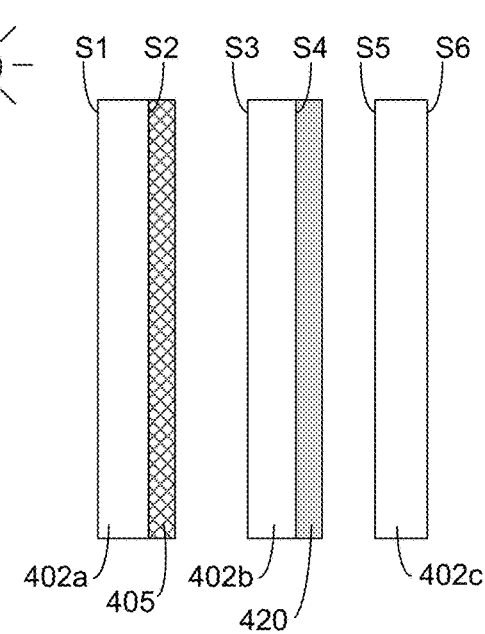
Figure 4P:
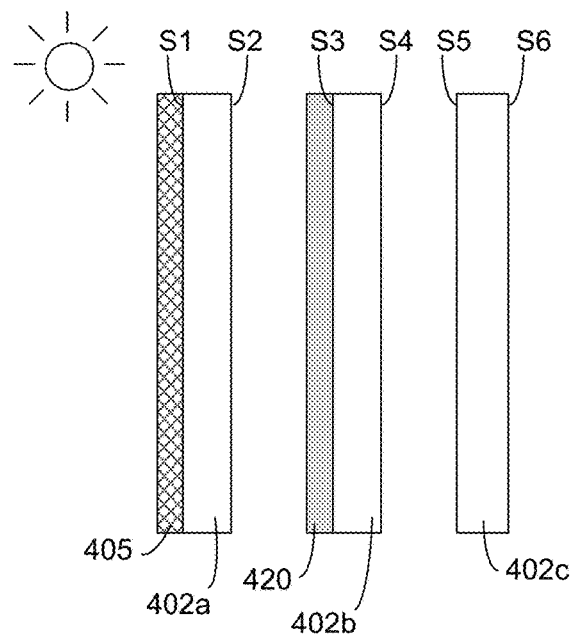
Figure 4Q:
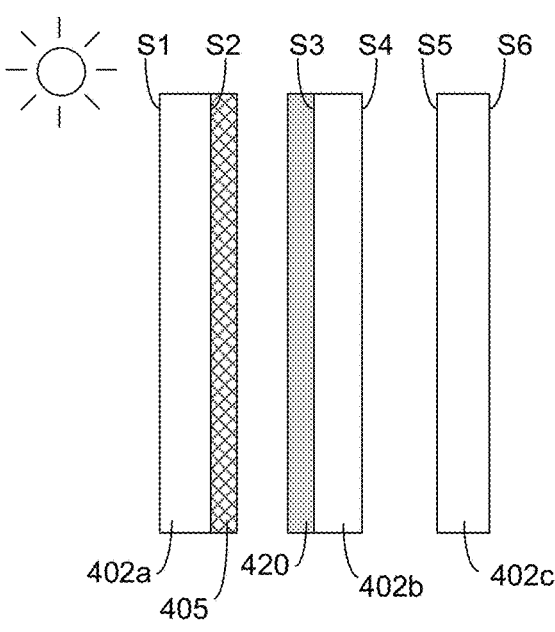

Returning to the embodiments of FIGS. 4G-4L, each of the patterned layer 405 and the electrochromic stack 420 may be provided on any one or more of S1, S2, S3, and S4, with the patterned layer 405 being provided inboard of the electrochromic stack 420. A number of examples are shown in FIGS. 4G-4L, which correspond to FIGS. 4A-4F, respectively, with the positions of the patterned layer 405 and the electrochromic stack 420 reversed. One difference between FIG. 4D and the corresponding FIG. 4J is that no low-emissivity coating 425 is shown in FIG. 4J. In this embodiment, the electrochromic device is provided on the external pane, so there is less concern about heating the interior due to a warm electrochromic device layer, and therefore less benefit to including the low-emissivity coating. As with the examples above, only some of the available configurations are explicitly shown in the figures, though all disclosed configurations are considered to be within the scope of the present embodiments. Further, any information presented above with respect to FIGS. 4A-4F regarding the relative positions of the patterned layer 405 and the electrochromic stack 420 may be reversed in embodiments where the patterned layer is provided inboard of the electrochromic stack.

Figure 4R:
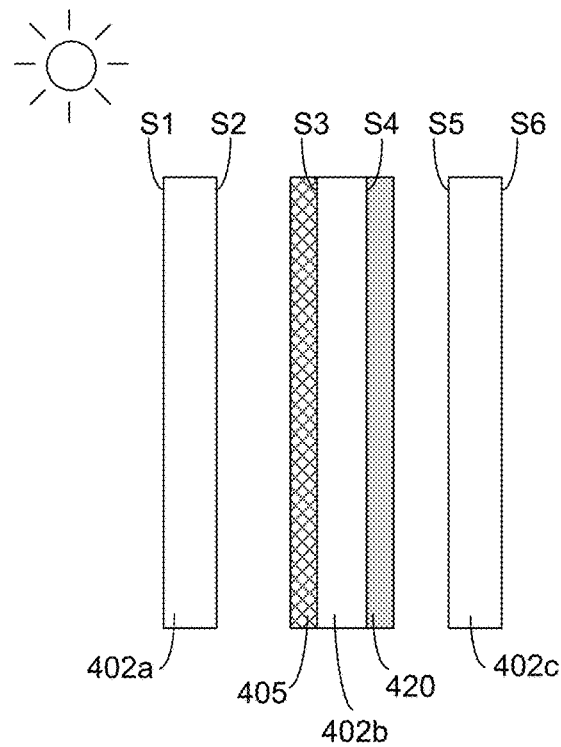

FIGS. 4M, 4N, and 4P-4X present embodiments of triple pane IGUs that include a third lite 402c in addition to the first and second lites 402a and 402b, respectively. The IGUs further include a patterned layer 405 and an electrochromic stack 420. From the outermost surface inward, the surfaces are labeled S1, S2, S3, S4, S5, and S6. In the embodiments of FIGS. 4M, 4N, and 4P-4X, the electrochromic stack (device coating) 420 is positioned on either S3 or S4. In other words, in these embodiments, the electrochromic stack 420 is positioned on the middle lite (though it may be provided elsewhere in other embodiments). Further, the patterned layer 405 is positioned outboard of the electrochromic stack 420 (though this may be reversed in some cases). While FIGS. 4M, 4N, 4P, and 4Q all show the patterned layer 405 on the first lite 402a (the most outboard lite), this is not always the case. In similar embodiments, the patterned layer 405 may be positioned on any one or more of the surfaces S1-S6. FIG. 4R shows one such embodiment, with the patterned layer 405 provided on S3 and the electrochromic device 420 provided on S4. As is the case with a dual pane IGU, the patterned layer may be positioned on an electrochromic lite (e.g., on the same surface as an electrochromic stack or on the other primary surface of the electrochromic lite) or on a different lite that is not electrochromic. In various cases where a triple pane IGU construction is used, the electrochromic stack may be positioned outboard of at least one pane and at least one pocket of gas, such that the gas pocket can act as a thermal barrier to reduce heat transfer from a warmed electrochromic stack into the building interior.

FIGS. 4S-4X present embodiments of triple pane IGUs that further include a low-emissivity coating 425. The low-emissivity coating 425 may be provided outboard of the electrochromic stack 420, thereby minimizing the degree to which the electrochromic stack 420 is heated by solar energy, and relatedly, minimizing the degree of heat transfer into the building interior. While FIGS. 4S-4X each show the low-emissivity coating 425 on S1 or S2 of the first lite 402a, and also show the electrochromic stack 420 on S3 or S4 of the second lite 402b, this is not always the case. In some other cases, a low-emissivity coating 425 and/or electrochromic stack 420 may be provided on a different (or additional) lite. Similarly, the patterned layer 405 may be positioned in a number of possible locations, as described herein. While FIGS. 4S-4X each show the patterned layer 405 outboard of the electrochromic stack 420, this may be reversed in some other embodiments.

Figure 4S:
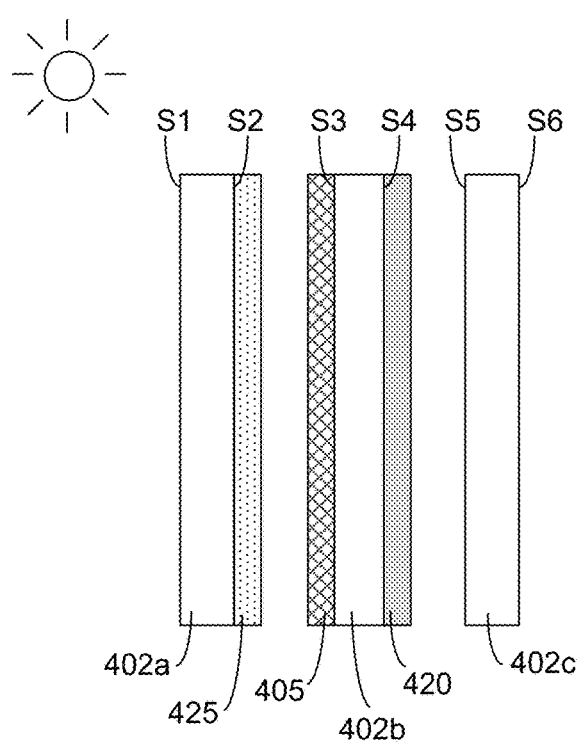
FIGS. 4S-4X depict embodiments of triple paned bird friendly electrochromic windows having a bird friendly layer, an electrochromic stack and a low-E coating each positioned at various locations.
Figure 4T:
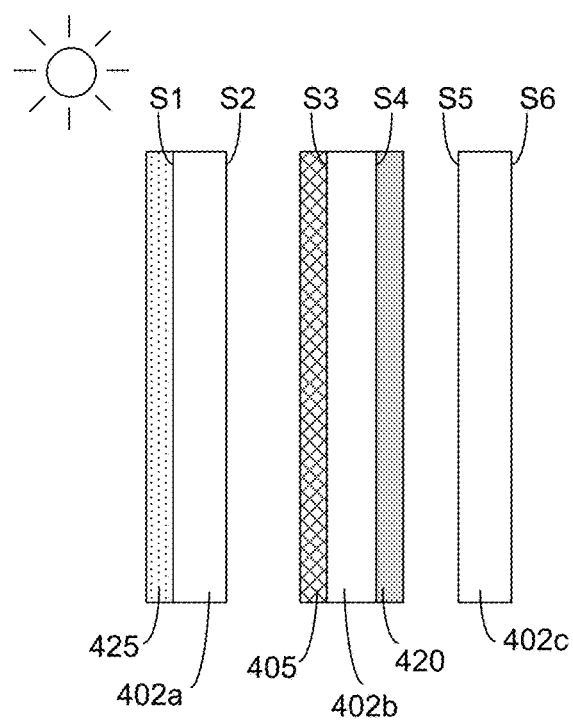
Figure 4U:
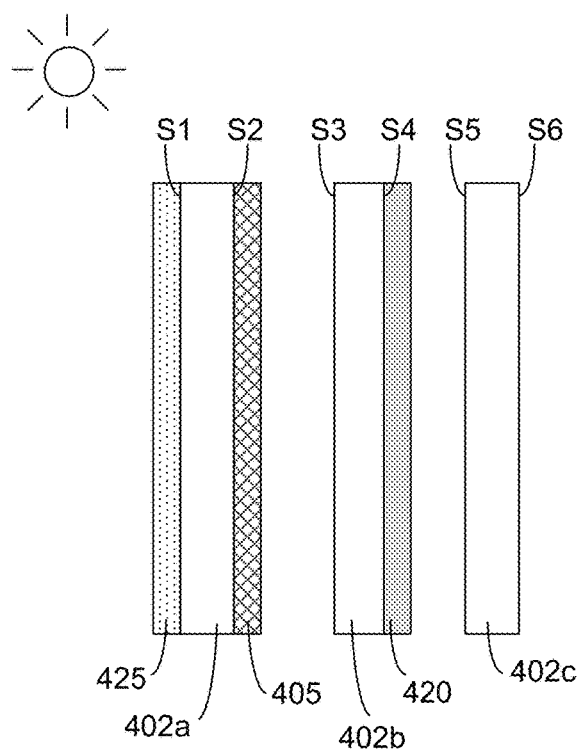
Figure 4V:
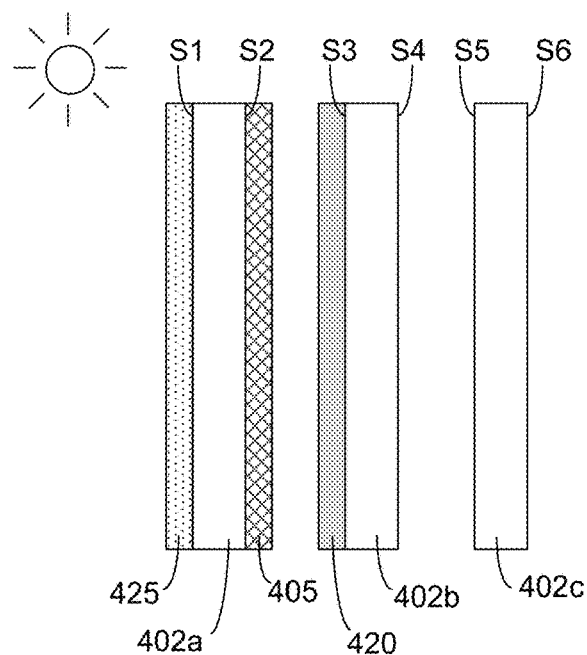
Figure 4W:
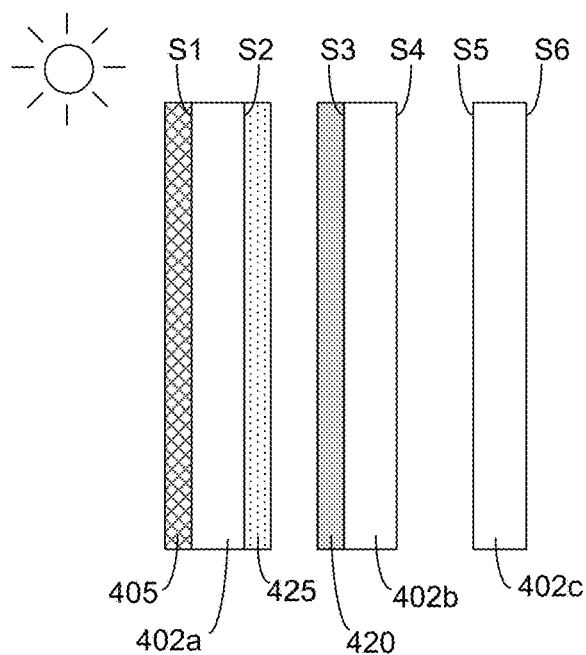
Figure 4X:
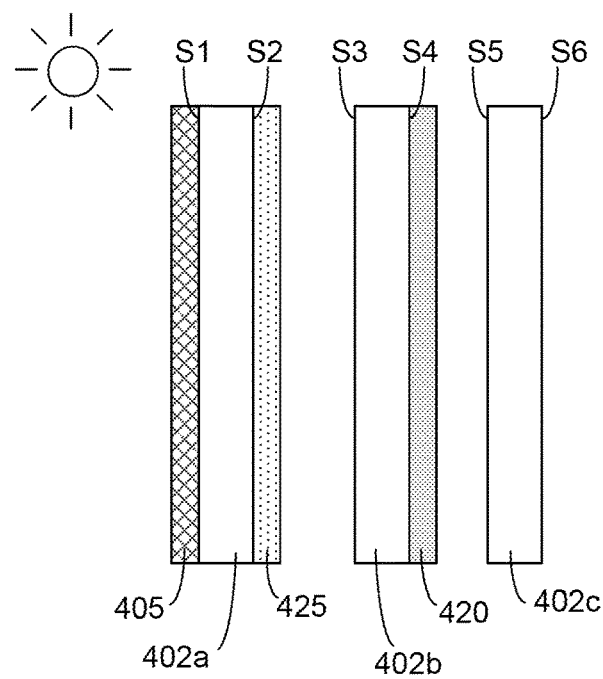

FIG. 4S depicts an embodiment where the low-emissivity coating 425 is provided on S2, the patterned layer 405 is provided on S3, and the electrochromic stack 420 is provided on S4. FIG. 4T depicts a similar embodiment where the low-emissivity coating 425 is provided on S1. FIG. 4U presents an embodiment where the low-emissivity coating 425 is provided on S1, the patterned layer 405 is provided on S2, and the electrochromic stack 420 is provided on S4. FIG. 4V presents a similar embodiment where the electrochromic stack 420 is provided on S3. FIG. 4W presents an embodiment where the patterned layer 405 is provided on S1, the low-emissivity coating 425 is provided on S2, and the electrochromic stack 420 is provided on S3. FIG. 4X presents a similar embodiment where the electrochromic stack 420 is provided on S4.

In certain implementations, the patterned layer and/or electrochromic stack may be provided at a different location on a triple paned IGU. FIGS. 4M, 4N, and 4P-4X illustrate only a limited number of possibilities. The patterned layer(s), the electrochromic stack(s), as well as other layers such as low-emissivity layer(s), anti-reflective layer(s), etc., may each be provided on any one or more of the surfaces S1-S6, with different advantages and disadvantages for each configuration. Any information related to the relative position of these layers in a dual pane IGU (or other construction) as described herein may also apply to embodiments where a triple pane IGU is used.

Figure 4Y:
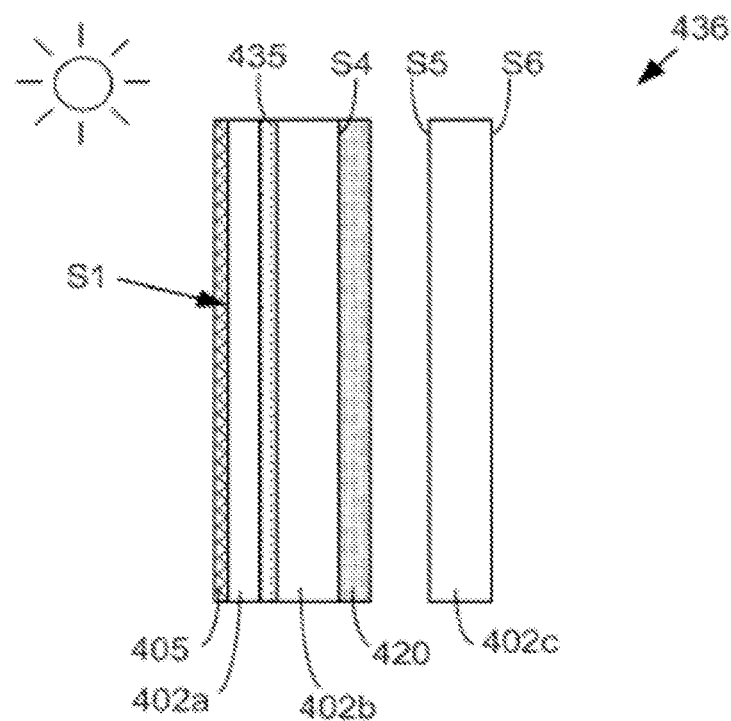
FIG. 4Y depicts a double pane IGU where the outboard lite is a laminate of an electrochromic lite and a non-electrochromic lite with bird friendly patterning thereon.

FIG. 4Y depicts a double pane IGU, 436, where the outboard lite is a laminate of an electrochromic lite, 402b, and a non-electrochromic lite, 402a, with bird friendly patterning thereon. In this example, the inboard lite, 402c, of IGU 436 may or may not have coatings, such as low-E, antireflective, UV scattering, and/or UV reflective coatings. The electrochromic coating, 420, is on S4 of the construct. The outboard lite of IGU 436 is a laminate of lite 402b and 402a, with surfaces S2 and S3 (not labeled for the sake of clarity) facing one another. Lamination adhesive, 435, may be of the resin lamination type or other lamination adhesive. Adhesive 435 may optionally include UV reflective and/or scattering particles or other UV optical properties. In such embodiments, if adhesive 435 has UV enhanced optical properties to make the IGU 436 visible to birds, then bird friendly patterning, 405, is optional. In certain embodiments, bird friendly patterning 405 is a film as described herein that is applied to lite 402a, e.g., a UV reflective or absorptive coating, a glass frit coating, a paint or the like. In other embodiments, bird friendly pattering 405 is etched, sandblasted or otherwise is part of lite 402a, i.e., not an applied coating but rather features of the lite itself. Lite 402a may be glass or plastic, thick or thin. In certain embodiments, lite 402a is thin flexible glass. Exemplary thin flexible glass includes thin and durable glass materials, such as Gorilla® Glass (e.g., between about 0.5 mm and about 2.0 mm thick) Willow™ Glass, and Eagle™ Glass, each commercially available from Corning, Incorporated of Corning N.Y. In one embodiment, the flexible glass is less than 1 mm thick, in another embodiment the flexible glass is less than 0.7 mm thick, in another embodiment the flexible glass is less than 0.5 mm thick, in another embodiment the flexible glass is less 0.3 mm thick, and in another embodiment the flexible glass is about 0.1 mm thick. In certain embodiments, the thin flexible glass may be less than 0.1 mm thick. Such substrates can be used in roll-to-roll processing to apply the glass to the electrochromic lite during lamination. Also, with thin glass, "peel and stick" adhesive technologies are easily implemented.

The lamination can be done after an IGU is constructed; e.g., using lites 402b and 402c a double pane IGU is fabricated, then lite 402a is laminated to lite 402b of the IGU. Lamination of a lite to an existing electrochromic IGU is described in U.S. Pat. No. 8,164,818, titled, "Electrochromic Window Fabrication Methods," which is herein incorporated by reference in its entirety. Advantages to lamination after IGU formation is that choice of lamination partner, e.g., lite 402a, can be made post IGU fabrication. This allows for greater flexibility in process flow, since the IGU fabrication line can undergo few if any changes; lite 402a is applied downstream. In other embodiments, lites 402a and 402b are laminated together and then the resulting laminate used, along with lite 402c, to make IGU 436.

Patterning Through Thickness Variations within a Layer

One method for patterning a layer within an electrochromic device is to use a layer having varying thickness, where the different thicknesses provide a contrast that birds can see, but humans cannot see, at least not easily. Such a method may be used on any layer within an electrochromic device that provides a visual contrast at different layer thicknesses that birds can appreciate. Various embodiments herein are presented in the context of a pattern formed in a buffer layer/DMIL made of titanium oxide, though the techniques herein may also be applied to other layers in the device.

Figure 4Z:
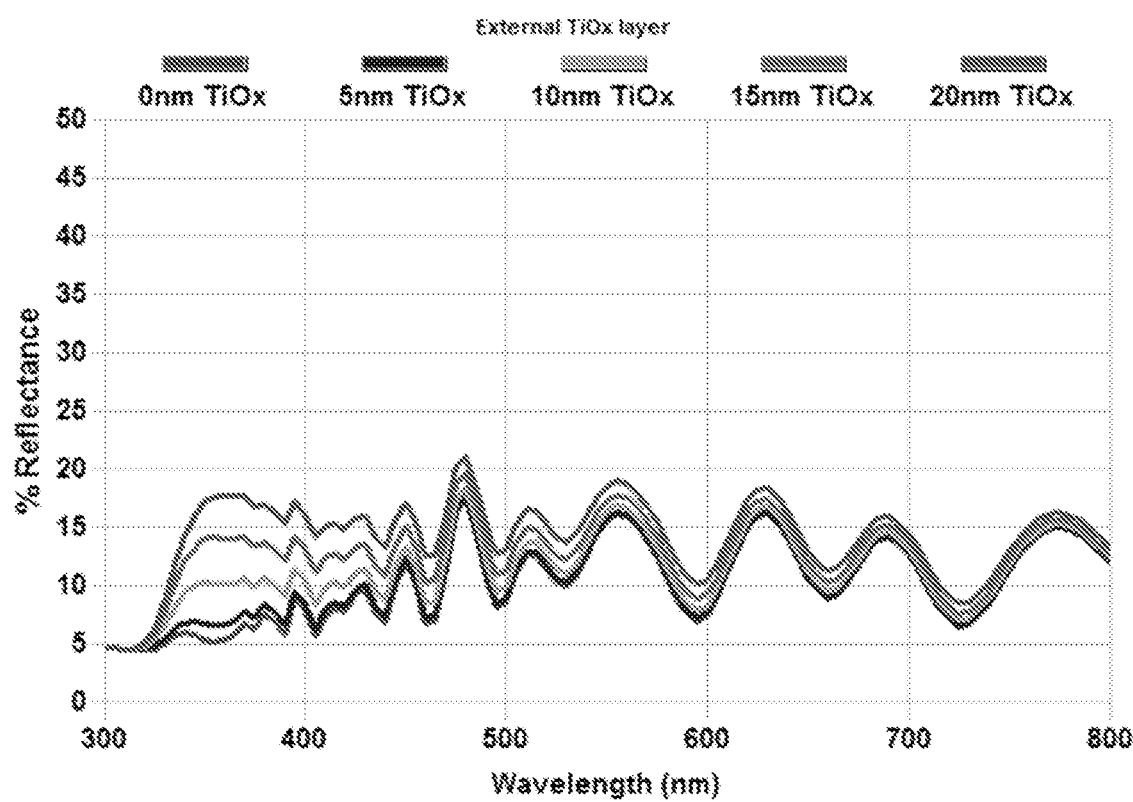
FIG. 4Z is a graph showing the reflectance vs. wavelength where different thicknesses of titanium oxide are provided on an electrochromic insulated glass unit.

FIG. 4Z provides a chart showing a model of the reflectance (%) vs. wavelength (nm) where different thicknesses of titanium oxide are provided on an outer surface of a pane of an IGU. The modeled reflectance is the R1 reflectance, which relates to the reflection of the IGU in the direction of the exterior of the building. In other words R1 is the reflection off of the exterior-facing surface of the exterior pane (often referred to as the S1 surface). The objects that were modeled in relation to FIG. 4Z were IGUs that included an electrochromic stack with a titanium oxide layer deposited on an outer surface of the exterior pane (i.e., on S1, the IGU surface that would be closest to a bird located outside). The different thicknesses of titanium oxide result in substantial differences in reflectance, particularly at low wavelengths such as in the UV spectrum. Within the spectrum visible by humans (about 400-700 nm), the differences in reflectance are smaller, especially above about 475 nm. Table 1 shows the change in reflectance compared to a baseline case where no $TiO_x$ is used, for both reflectance at 370 nm (a UV wavelength easily viewable by birds but not by humans), and for photopic reflectance visible by humans.

TABLE 1

| $TiO_x$ Thickness | % Change in Reflectance at 370 nm, Compared to Baseline | % Change in Photopic Reflectance, Compared to Baseline |
| --- | --- | --- |
| 5 nm | 55% | 5% |
| 10 nm | 153% | 18% |
| 15 nm | 258% | 39% |
| 20 nm | 347% | 63% |

As shown in Table 1, the changes in reflectance in the UV are substantially greater than the changes in photopic reflectance, meaning that a pattern etched into a TiOx layer will be much more noticeable to birds than to humans. As such, birds can perceive the pattern and understand that they can't fly through the window, while at the same time human occupants enjoy a relatively clear (unpatterned) view through the window.

While the results in FIG. 4Z relate to an IGU with a titanium oxide layer that is positioned on the outside of an IGU, the results suggest that $TiO_x$ thickness can be tuned to create regions of contrasting reflectance in the UV (wherever such $TiO_x$ layers are provided). For example, $TiO_x$ regions having a first thickness would show greater reflectance and $TiO_x$ regions having a second thickness would show less reflectance. The first thickness may be less than or greater than the second thickness. A bird could perceive this contrast (and therefore the pattern on the window) and recognize that it cannot fly through the window.

The varying thickness of the patterned layer may be achieved in a number of ways. In one embodiment, the layer is deposited at a uniform thickness, and portions of the layer are etched away to form the pattern. In one embodiment, the entire thickness of the patterned layer is etched through, as discussed below in relation to FIG. 5A. In such cases, the etching process may expose an underlying layer positioned below the patterned layer. In another embodiment, only a portion of the thickness of the patterned layer is etched through, as discussed below in relation to FIG. 5B.

Figure 5A:
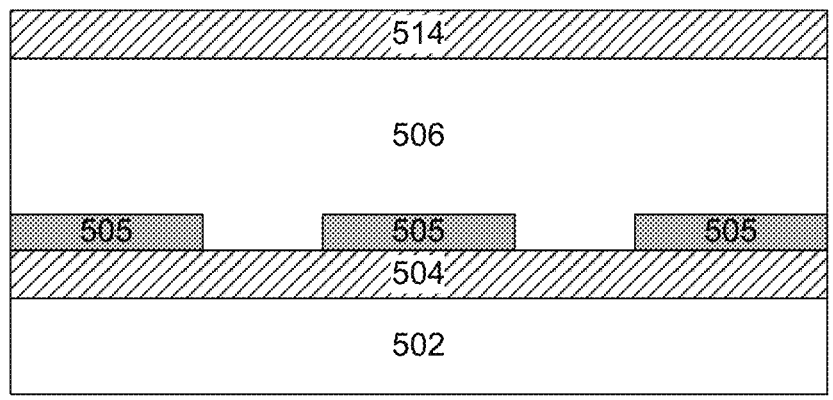
FIGS. 5A-5G depict cross-sectional views of various embodiments of electrochromic devices that are patterned to be bird friendly.

FIG. 5A illustrates a cross-sectional view of an electrochromic device according to certain embodiments. FIG. 6A presents a flow chart for a method of forming a portion of the electrochromic device shown in FIG. 5A. With respect to FIG. 5A, the device includes a substrate 502, a first conductive layer 504, a patterned bird friendly layer 505, an electrochromic stack 506, and a second conductive layer 514. The patterned layer 505 is discontinuous in this example. The electrochromic stack 506 in FIGS. 5A-5G includes at least a cathodically coloring electrochromic layer and an anodically coloring (or optically passive) counter electrode layer (and, as opposed to the electrochromic stack 120 of FIG. 1, does not include the conductive layers, which are shown separately). In various embodiments electrochromic stack 506 also includes an ion conducting layer or ion conducting region. Such a region may be deposited along with and between the electrochromic and counter electrode layers, or it may form at the interface of such layers in later processing steps, as discussed further in U.S. Pat. No. 8,764,950, which is herein incorporated by reference in its entirety.

In order to fabricate the device of FIG. 5A, the method 600 of FIG. 6A may be used. The method 600 begins at operation 601 where a substrate 502 is received with a conductive layer 504 thereon. In a similar embodiment, the method may include depositing the conductive layer 504 on the substrate 502. Conductive layers and deposition thereof is further discussed in U.S. patent application Ser. No. 12/645,111, filed Dec. 22, 2009, and titled "FABRICATION OF LOW DEFECTIVITY ELECTROCHROMIC DEVICES," which is herein incorporated by reference in its entirety. Next, at operation 603, the layer to be patterned is deposited. This layer may be referred to as a pre-patterned layer, and will eventually form patterned layer 505 in FIG. 5A. The pre-patterned layer may be deposited to a relatively uniform thickness, and then portions of the film may be removed. In some cases, the thickness of the pre-patterned layer (where deposited) may be between about 5-200 nm, or between about 30-80 nm. In some such cases, the thickness of the pre-patterned layer may be at least about 7 nm (where deposited). In these or other cases, the thickness of the pre-patterned layer may be about 200 nm or less (where deposited). In a particular embodiment the pre-patterned layer may be titanium oxide, though other materials may also be used as appropriate.

Next, at operation 605, the pre-patterned layer is etched to form the patterned layer 505. The pattern formed may in various embodiments have one or more of the characteristics described above, for example the dimensions listed above and/or the designs shown in FIGS. 3B-3H. In the embodiment of FIG. 5A, the entire thickness of the pre-patterned layer is etched through, thereby exposing the underlying first conductive layer 504. The etching may occur through laser etching methods, chemical etching methods, abrasive etching methods, etc.

After the etching operation 605, one or more optional cleaning operations (not shown in FIG. 6A) may take place to remove any residues or other undesirable materials. Such cleaning may occur through various available methods including, but not limited to, flat plate washers, which may be used to polish the materials if desired.

Next, the electrochromic stack 506 is deposited in operation 607. In some embodiments, the stack 506 is deposited to include at least a cathodically coloring electrochromic layer, an ion conductor layer, and an anodically coloring (or optically passive) counter electrode layer. In some other embodiments, the stack 506 is deposited to include at least a cathodically coloring electrochromic layer and an anodically coloring (or optically passive) counter electrode layer, which may be in direct physical contact with one another. In these implementations, an ion conducting region may form between the electrochromic and counter electrode layers, for example through multistep thermal conditioning (MTC) as described in U.S. Pat. No. 8,764,950, which is incorporated by reference above. Deposition of the various layers in the electrochromic stack 506 is further discussed in U.S. patent application Ser. No. 12/645,111, which is incorporated by reference above. After the electrochromic stack 506 is deposited, the second conductive layer 514 is formed in operation 609. The multistep thermal conditioning may occur (if at all) after the second conductive layer 514 is deposited.

In another method, operation 603 involves selectively depositing the patterned layer 505 in regions where it is desired. In order to avoid depositing the patterned layer 505 in regions where it is not desired, such regions may be masked in operation 603. Operation 605 may then be eliminated. A series of masks may be used in some cases. In one embodiment, a mask may be rotated and/or otherwise re-positioned between subsequent depositions performed on the same substrate.

Figure 5B:
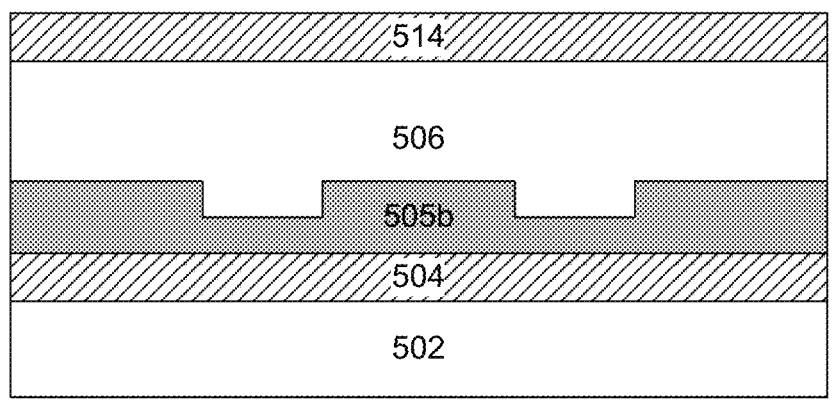
Figure 6A:
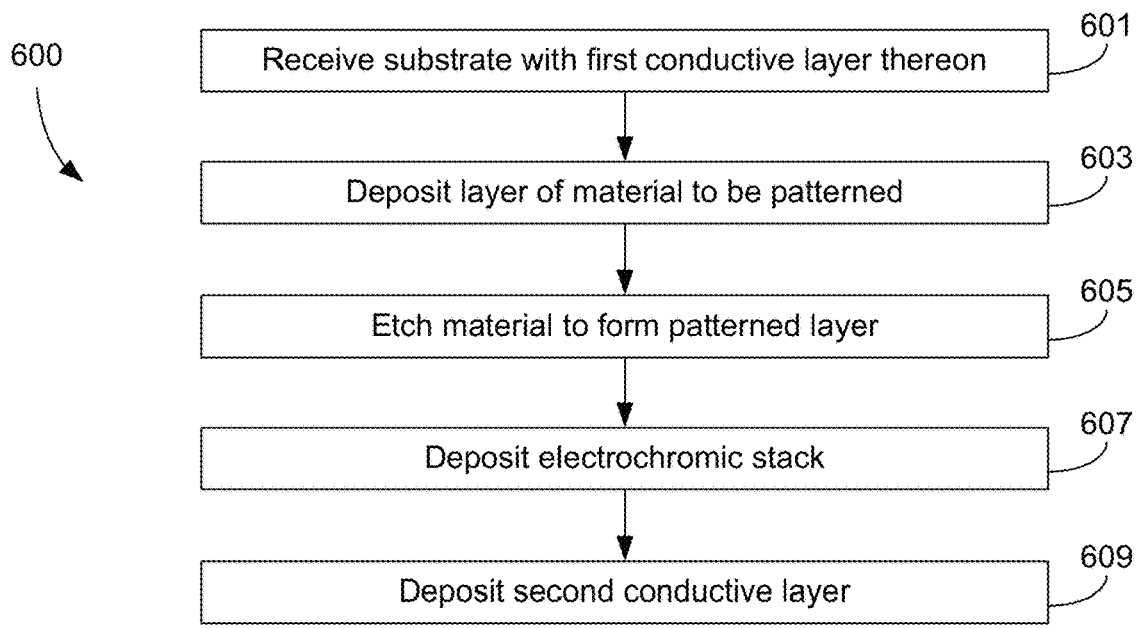
FIGS. 6A and 6B are flow charts describing methods of fabricating the devices shown in FIGS. 5A-5G.

FIG. 5B presents a cross-sectional view of another embodiment of an electrochromic device that is patterned to be bird friendly. This embodiment is similar to FIG. 5A, and for the sake of brevity only the differences will be described. In FIG. 5B, the patterned layer 505b is continuous and includes two different thicknesses. In certain embodiments where the patterned layer includes different thicknesses to provide the contrast visible by birds, the difference in thickness may be at least about 30 nm, or at least about 90 nm. In some such cases, the thickness difference may be about 40 nm or less, or about 100 nm or less. In some embodiments, a thicker portion of the patterned layer may be at least about 2× as thick as a thinner portion of the patterned layer (e.g., at least about 3× as thick). The thickness difference may result in an average reflectance difference of at least about 5% when considering wavelengths between about 300-400 nm. The thickness difference may also result in an average reflectance difference below about 1% when considering wavelengths between about 400-700 nm.

One reason that one of skill might choose the design of FIG. 5B over the design of FIG. 5A is that the patterned layer 505 may also be used as a defect-mitigating-insulating layer. Where this is the case, it is desirable that the patterned layer 505 substantially covers the first conductive layer 504 in a continuous manner. This continuous coverage can help form devices with fewer defects and a lower risk of electrical shorts forming within the device.

The method 600 of FIG. 6A may be used to form the electrochromic device shown in FIG. 5B. The method will be very similar to that described in relation to FIG. 5A, except that operation 605 is terminated before the layer is completely etched through. As noted above, operation 605 may be eliminated in cases where operation 603 involves selective deposition to form the pattern. For instance, operation 603 may include a first deposition that deposits material at a uniform thickness, followed by a second deposition that selectively deposits additional material where it is desired. In some cases, a mask may be used as described above to achieve the selective deposition.

Patterning Through Composition/Material Variations

In a number of embodiments, recesses in an etched patterned layer may be filled with one or more materials. For instance, a buffer layer may be provided to fill these recesses. The material that fills the recesses may also deposit over non-recessed portions of the patterned layer. The pattern formed in the patterned layer may be visible by birds either through optical contrasts arising from thickness differences within the patterned layer and/or within the buffer layer, and/or it may be visible through optical contrasts arising from different optical properties of the material used for the patterned layer vs. the material used for the buffer layer. In some cases, a buffer layer as described in relation to FIGS. 5C-5G may be considered a second patterned layer or index layer (and may or may not have properties similar to other buffer layers used in the context of electrochromic windows).

The material chosen to fill the recesses in the patterned layer may be chosen to have certain properties. In some cases, this material has a relatively high resistivity, for example between about 1 and $5 \times 10^{10}$ Ohm-cm. The material may also have a different index of refraction compared to the material of the patterned layer (at least in UV). In some cases, the material used to fill recesses in the patterned layer is one that has a relatively low index of refraction (n), for example below about 1.5 in some cases. In a particular example, the material used to fill recesses in the patterned layer is silicon oxide. In another example, the material used to fill recesses in the patterned layer may be the same material at a different relative composition compared to the material used for the patterned layer. For instance, both the patterned layer and the material used to fill recesses in the patterned layer may be titanium oxide provided at different stoichiometry.

Figure 7A:
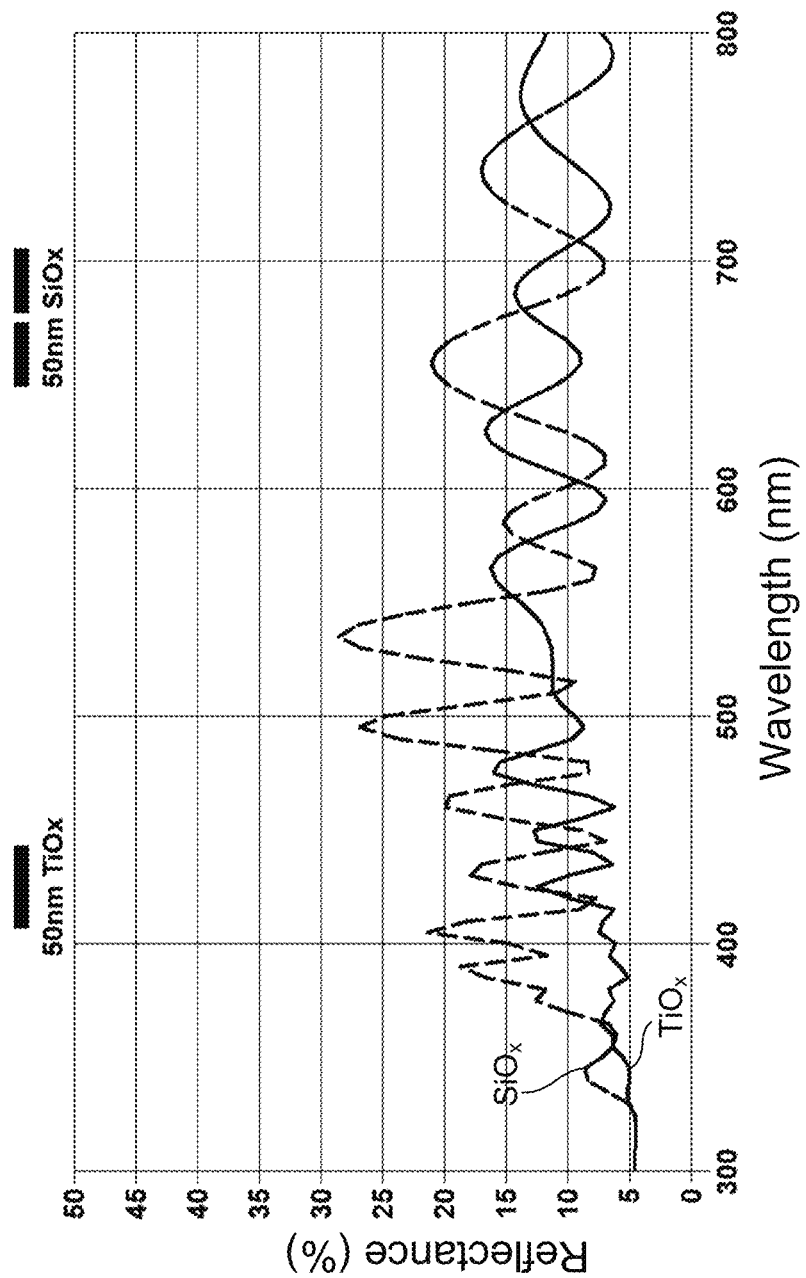
FIG. 7A is a graph showing the reflectance vs. wavelength where an electrochromic insulated glass unit includes either a layer of titanium oxide or a layer of silicon oxide.

FIG. 7A presents a graph depicting the reflectance (%) vs. wavelength (nm) modeled for two IGUs that include an electrochromic device stack and a layer of either 50 nm thick $TiO_x$ or 50 nm thick $SiO_x$. The reflectance modeled relates to the R1 reflectance, which represents the reflection off of the exterior pane (which would be closest to a bird). The TiOx/SiOx layers were modeled as being located between a conductive oxide layer and the electrochromic stack. The electrochromic device was modeled to be in its clearest state. Notably, at about 370 nm, the TiOx and SiOx materials show about a 60% difference in their reflectance, which would be easily visible to most birds. By contrast, when considering the difference in the photopic reflection (reflection in the spectrum visible by humans), the TiOx and SiOx materials show about an average of 32% difference in their reflectance. In other words, the change in reflectance is about twice as high at 370 nm (easily viewable by birds) than at wavelengths viewable by humans. Though the graph shows various ripples at different wavelengths, these ripples are not particularly important because humans and birds do not perceive individual wavelengths, rather, humans and birds see an average of the transmitted wavelengths, weighted appropriately for sensitivity. For instance, birds will see an average of the wavelengths between about 300-700 nm, while humans will see an average of the wavelengths between about 400-700 nm.

Figure 5C:
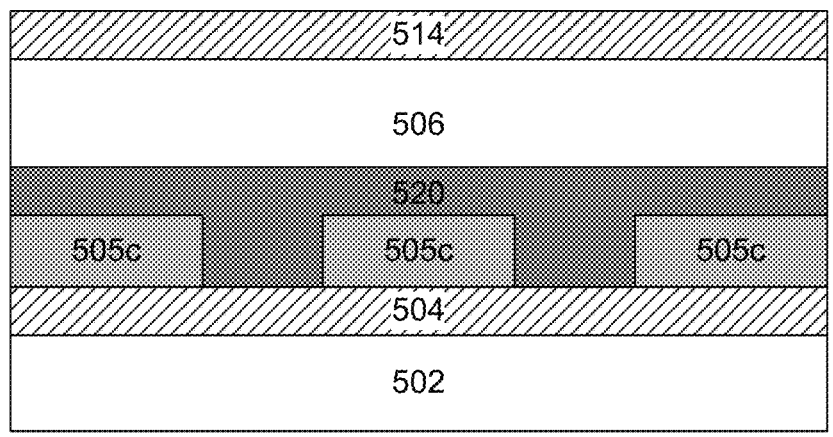

FIG. 5C presents a cross sectional view of another embodiment of an electrochromic device that is patterned to be bird friendly. This embodiment is similar to that shown in FIG. 5A, and only the differences will be addressed.

In FIG. 5C, the device includes a discontinuous patterned layer 505c, much like the patterned layer 505 of FIG. 5A. Positioned above the patterned layer 505c is a buffer layer 520. This buffer layer 520 may be made of a material that contrasts with the patterned layer 505c. For instance, buffer layer 520 may be made of a material that has a different refractive index than patterned layer 505c. Differences in reflectance/absorbance/transmittance/related optical properties between the buffer layer 520 and the patterned layer 505c can help make the window visible to birds.

Figure 6B:
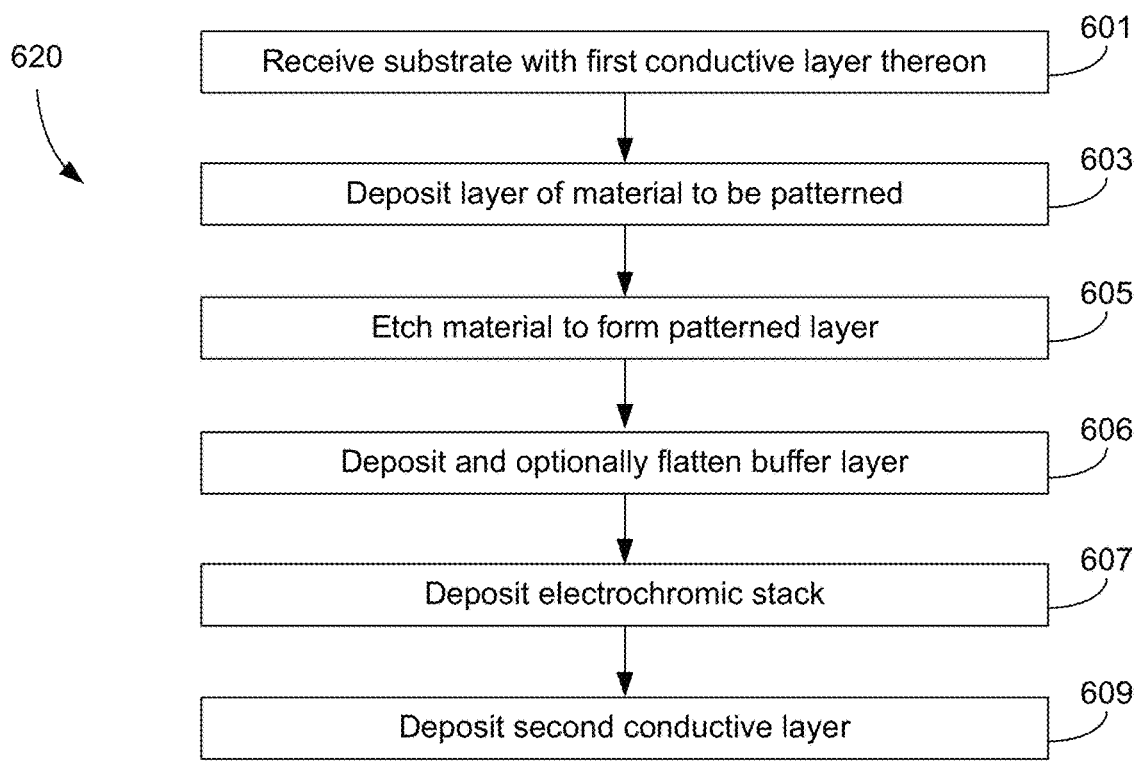

FIG. 6B is a flow chart depicting a method of forming the electrochromic device shown in FIG. 5C. The method 620 in FIG. 6B is similar to the method 600 of FIG. 6A, and only the differences will be discussed. In particular, the method 620 includes an additional step, operation 606, where the buffer layer 520 is deposited and optionally flattened. The buffer layer 520 is deposited after the pre-patterned layer is etched to form the patterned layer 505c. In some embodiments, the partially fabricated device may be cleaned after the patterned layer 505c is formed from the pre-patterned layer, and before the buffer layer 520 is formed. The buffer layer 520 may deposit in areas where the pre-patterned layer was etched away. The buffer layer 520 may also deposit over areas where the patterned layer 505c remains.

Because the buffer layer 520 is deposited over an uneven surface, it may be beneficial in certain embodiments to planarize the buffer layer before further processing, to thereby form a flat, uniform layer upon which the electrochromic stack 506 can be deposited. In some other embodiments this planarizing step may be omitted. Such planarizing may occur through chemical mechanical polishing (CMP), etching (e.g., with plasma) and the like.

The buffer layer 520 may be made of a variety of materials. In some embodiments, the buffer layer 520 is suitable as a defect-mitigating-insulating layer. For instance, the buffer layer may be a material having an electronic resistivity between about 1 and $5 \times 10^{10}$ Ohm-cm. By using such a material in combination with a patterned layer 505c, the risk of forming defective devices can be minimized.

In some implementations, at least one of the patterned layer 505c and the buffer layer 520 is made of titanium oxide. In some cases, the other of the patterned layer 505c and the buffer layer 520 is made of silicon oxide. The silicon oxide may be $SiO_2$ in some cases, though other relative compositions and materials may also be used. In a particular embodiment, the patterned layer 505c is titanium oxide and the buffer layer 520 is silicon oxide.

In various embodiments, the buffer layer 520 may be deposited up to a height that is at least about as high as the patterned layer 505c. In some cases, as shown in FIG. 5C, the buffer layer 520 may be deposited to a height that is above the patterned layer 505c, thereby forming a continuous buffer layer 520.

As discussed with relation to the method 600 of FIG. 6A, the method 620 of FIG. 6B may be modified such that operation 603 involves selectively depositing the patterned layer in areas where it is desired, for example through use of one or more masks. Operation 605 may then be eliminated.

Figure 5D:
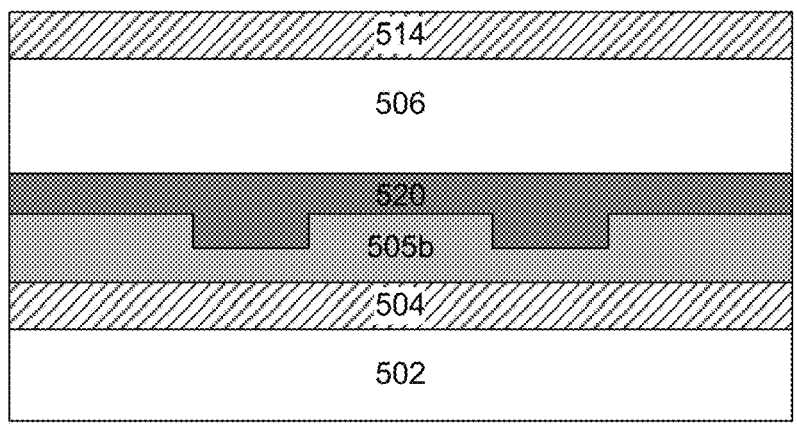

FIG. 5D illustrates an additional embodiment of an electrochromic device that is patterned to be bird friendly. This embodiment combines the patterned layer 505b of FIG. 5B (which was etched only part way through) with the buffer layer 520 of FIG. 5C. This device could be fabricated using the method 620 of FIG. 6B.

Figure 5E:
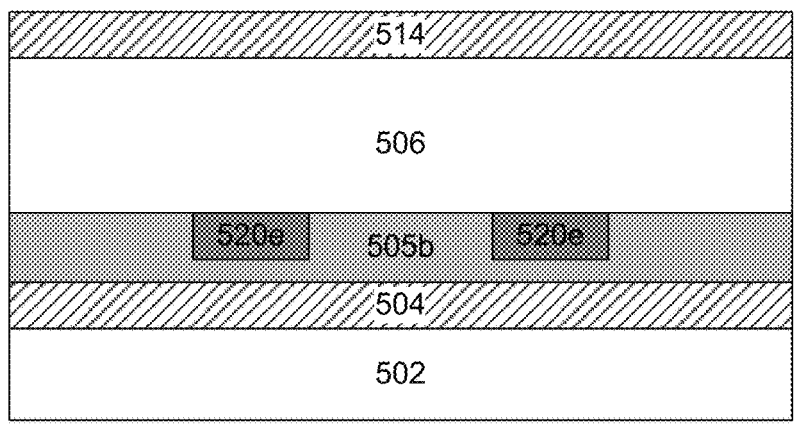

FIG. 5E depicts another example embodiment of an electrochromic device that is patterned to be bird friendly. This embodiment is similar to that shown in FIG. 5D, except that the buffer layer 520e is discontinuous. The device shown in FIG. 5E may be fabricated using the method 620 of FIG. 6B in some cases. For instance, in operation 605 the pre-patterned layer is partially etched through to form the patterned layer 505b. An optional cleaning operation may occur, followed by operation 606 where the buffer layer is deposited. The buffer layer may be deposited over all portions of the patterned layer 505b, including in areas where the pre-patterned layer was etched away. The buffer layer 520e may then be flattened/polished to thereby remove the buffer layer 520e in regions where the patterned layer 505b is thickest. Some portion of the patterned layer 505b may also be removed during this flattening process.

Figure 5F:
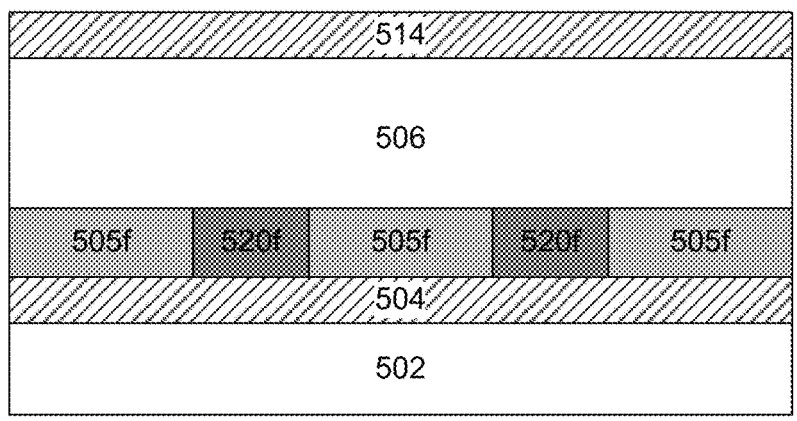

FIG. 5F shows yet another example embodiment of an electrochromic device that is patterned to be bird friendly. This embodiment is similar to that shown in FIG. 5E, except that both the patterned layer 505f and the buffer layer 520f are discontinuous. The method 620 of FIG. 6B can be used to fabricate the device shown in FIG. 5F. In such an implementation, operation 605 involves etching through the entire thickness of the pre-patterned layer to form the patterned layer 505f. The partially fabricated device may then be cleaned, and then the buffer layer 520f may be deposited at operation 606. The buffer layer 520f may deposit on all regions of the patterned layer 505f before being removed through flattening/polishing in areas where the patterned layer 505c is present.

In FIGS. 5A and 5B, the contrast visible by birds may be generated due to having different thicknesses within the patterned layer. In such embodiments, the patterned layer may be made of a material that exhibits contrasting visual properties (particularly at UV wavelengths as described above) at different thicknesses. In FIGS. 5C-5F, the contrast visible by birds may be generated as a result of (a) differences in thickness within the patterned layer, where the patterned layer exhibits contrasting properties at different thicknesses, (b) differences in thickness in the buffer layer, where the buffer layer exhibits contrasting properties at different thicknesses, (c) differences in optical properties between the patterned layer and the buffer layer, or (d) some combination thereof. In FIGS. 5C-5F, the patterned layer and the buffer layer may together form the pattern that is visible by birds.

FIGS. 5A-5F depict embodiments where a patterned layer is positioned between a first conductive layer 504 and the electrochromic stack 506. However, the patterned layer may also be positioned at other locations, for example between the substrate 502 and the conductive layer 504, between the electrochromic stack 506 and the second conductive layer 514, and/or on the outer surface of the substrate 502 (or on an interior or exterior facing surface of another substrate, for example a second substrate provided in an IGU). Any of the techniques and/or configurations related to patterned and/or buffer layers shown and described in relation to FIGS. 5A-5F may also be used to form a patterned layer (and buffer layer, if appropriate) in these alternative locations. For the sake of brevity, only one such example is shown in the figures.

Figure 5G:
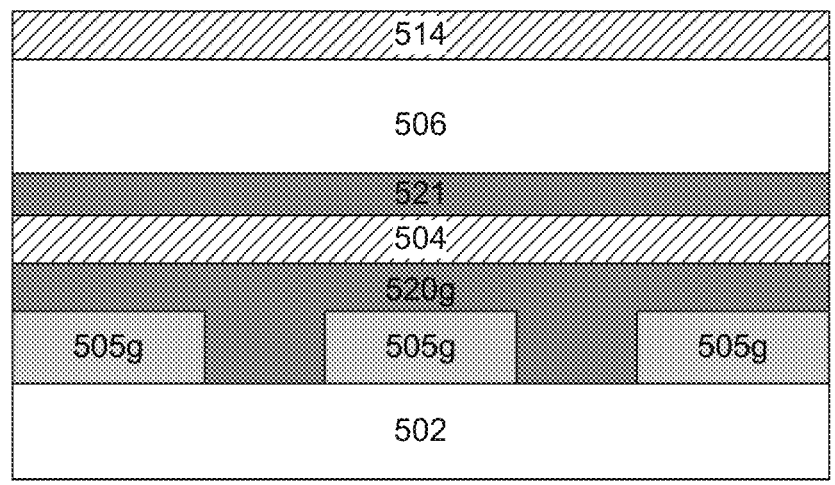

FIG. 5G shows an embodiment of an electrochromic device patterned to be bird friendly, where a discontinuous patterned layer 505g is provided with a continuous buffer layer 520g, each provided between the substrate 502 and the first conductive layer 504. This embodiment is similar to that shown in FIG. 5C, except for the location of the patterned layer 505g and buffer layer 520g. The electrochromic device in FIG. 5G also includes a second buffer layer 521 positioned between the first conductive layer 504 and the electrochromic stack 506, though this layer may be omitted in some embodiments.

As discussed further below, the window may also be made hazy in the UV, which may render it easier for birds to see. The discussion below focuses on embodiments where the entire window is made hazy. However, such haziness can also be formed in a pattern, for example as described in relation to FIGS. 3B-3H. The contrasting pattern features in this case may include the relatively more hazy portions and the relatively less hazy portions. Both global window haziness and patterned window haziness, particularly where such haziness is more visible to birds than to humans, are considered to be within the scope of the disclosed embodiments.

Methods of Making an Electrochromic Window Appear Hazy

Another method of reducing the risk that a bird will try to fly through a window is to make the window appear hazy. Where such haziness is relatively strong at wavelengths visible by birds (but not by humans) and relatively weak at wavelengths visible by humans, the result is high quality bird friendly glass. Haze may be provided as a pattern having a strong contrast in the bird-visible ultraviolet region. Transmission haze and/or reflection haze may be utilized in various embodiments. Transmission haze is the forward scattering of light from the surface of a nearly clear substrate viewed in transmission. Light scattered back through the sample is typically not included in transmission haze. Only light that is scattered more than 2.5° from the incident light is considered to contribute to the haze. When measuring transmission haze, the percentage of light diffusely scattered compared to the total light transmitted is reported. Reflection haze is the spread of the specular component of the reflected light from a glossy surface. The light that is reflected from an object at an angle equal to but opposite the incident light is the specular component.

The appearance of haziness is a result of light scattering, which is strongly dependent on wavelength. In particular, light scattering intensity (I) is inversely proportional to the fourth power of the wavelength ($\lambda$) of light ($I \propto 1/\lambda^4$). This means that lower wavelengths tend to scatter substantially more than higher wavelengths.

The structure of a material can affect whether or not light will be scattered when traveling through the material. The degree of crystallinity and the size of crystallites within a material are relevant, as are the grain boundaries, microscopic pores, density variations, or other defects (if present). The length scale of these structural features relative to the wavelength of light being scattered is relevant. As such, the morphology/structure of a given layer can be tuned to provide scattering in UV that renders the window visible to birds but transparent/clear to humans.

One way to tune the morphology of a layer is to control the conditions at which the layer is deposited to achieve a particular crystallinity. Factors such as substrate temperature during deposition, sputter power, and chamber pressure can affect the crystallinity of a deposited material.

Crystallinity depends on various deposition factors including deposition temperature, deposition pressure, rate of deposition, and method of deposition (e.g., evaporation, magnetron, chemical vapor deposition, etc.). Further details related to process conditions that may be used in some embodiments are provided in U.S. patent application Ser. No. 12/645,111, filed Dec. 22, 2009, and titled "FABRICATION OF LOW DEFECTIVITY WINDOWS," which is herein incorporated by reference in its entirety. In some implementations, deposition conditions may be chosen to provide a polycrystalline material having crystallites on the order of 50-200 nm.

Another way to configure a material to scatter in the UV is to enhance the roughness of the layer. Such roughness can promote scattering in UV when done at an appropriate length scale. In various cases the scattering is not visible to humans.

Layers for Introducing Bird-Visible Haze

As noted above, in certain embodiments a layer in an electrochromic window may be made globally or locally hazy (when considering UV wavelengths) to minimize the risk that a bird will try to fly through the window. The layer which is made hazy may be a layer that is commonly included in electrochromic windows, or it may be a new layer provided specifically for this purpose.

The haze-inducing layer may be positioned at any point within or on an electrochromic IGU or other electrochromic window. In a number of embodiments, the haze-inducing layer may be positioned between panes of an IGU. For example, it may be positioned between a substrate and a conductive layer, or between a conductive layer and an electrochromic stack, or between a conductive layer and a defect-mitigating-insulating layer, or between a defect-mitigating insulating layer and an electrochromic stack. In some other cases, a haze-inducing layer may be provided outside the panes of the IGU, for example on an exterior surface of an exterior pane (often referred to as S1) or on an interior surface of an interior pane (often referred to as S4), or on an additional substrate that may be laminated to either S1 or S4. In various embodiments, the patterned layer 405 shown in FIGS. 4A-4Y may be a haze-inducing layer, which may be uniformly hazy or patterned to include hazy portions (visible to birds but not humans) and non-hazy portions (transparent to both birds and humans).

The layer that selectively appears hazy at UV wavelengths may be made of a variety of materials. In some embodiments, a hazy layer may be a thin film that is substantially transparent to UV. The material of the hazy layer may be one having a polycrystalline structure having a grain size on the order of about 50-200 nm.

In particular implementations, a hazy layer may be made of titanium oxide, though various other materials listed herein may also be used.

Other Bird Friendly Window Configurations

Various embodiments herein relate to electrochromic windows that are designed to be visible to birds, for example by reflecting a pattern and/or haze that is apparent at UV wavelengths. For the sake of simplicity, the layer or layers that form a pattern and/or haze which renders the window visible to birds may be referred to as a bird friendly element. As noted above, one or more bird friendly elements may be positioned at a number of different locations on the window. Regardless of where the bird friendly element is positioned, it should be visible to a bird through all of the layers situated between the bird and the bird friendly element.

For example, if a glass substrate used in an electrochromic window absorbs a substantial amount of light at the wavelengths that produce the visual contrast, such contrast may not be transmitted through the substrate, and therefore may not actually be visible to the birds. Therefore, the choice of substrate can affect how bird friendly a window is.

Certain types of glass or other window substrates may be better suited for bird safe windows than other types of substrates. Substrates that absorb more UV, particularly in the UVA range, are generally less suitable.

Figure 7B:
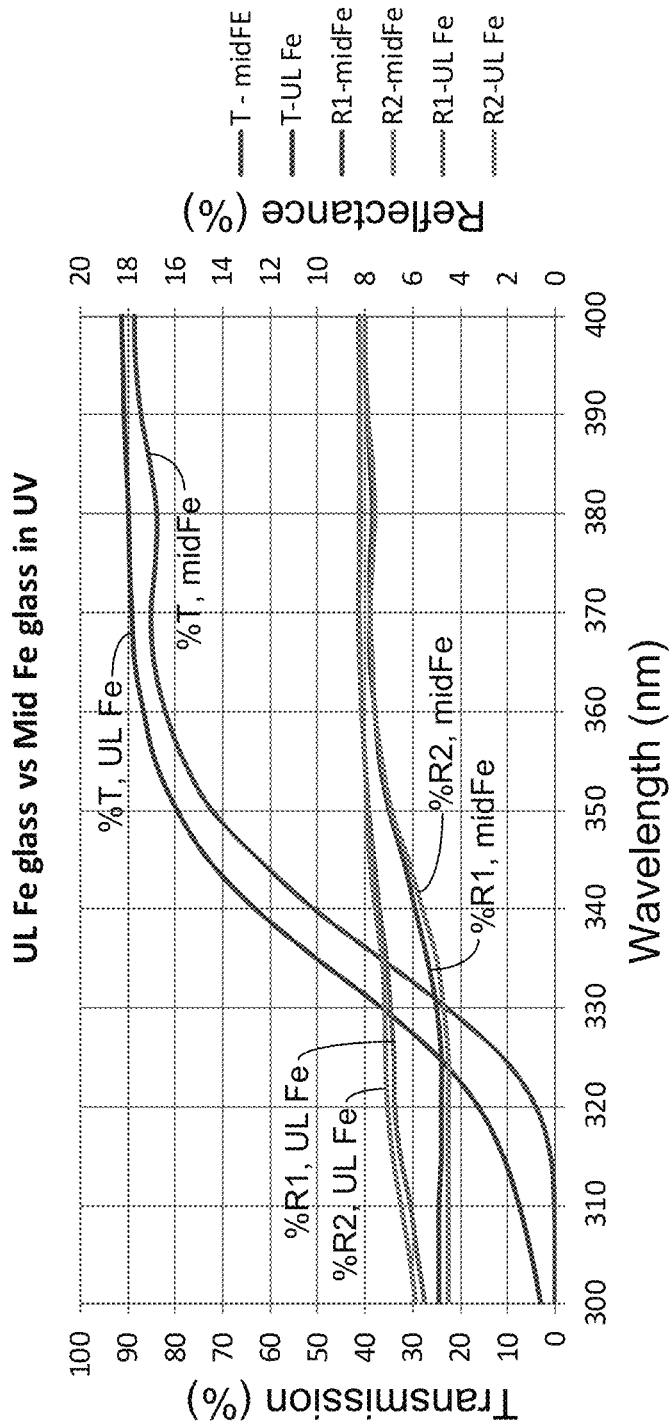
FIG. 7B is a graph showing transmission vs. wavelength for different types of glass.

FIG. 7B presents a graph showing the transmission (%) and reflectance (%) vs. wavelength (nm) for two types of glass substrates having a thickness of about 6 mm. One of the substrates tested was glass having a mid-level content of iron (referred to in FIG. 7B as midFe, typically a slightly greenish color), and the other substrate tested was glass having an ultra-low content of iron (referred to in Figure at as UL Fe, typically a slightly white color). With respect to reflectance, two reflectances are shown, R1 and R2. R1 refers to the reflection off of the exterior surface (often referred to as S1) and R2 refers to the reflection off of the interior surface (often referred to as S2). FIG. 7B suggests that glass having an ultra-low content of iron may be beneficial compared to glass having a mid-level content of iron, at least because the ultra-low iron content glass shows higher transmission at all UV wavelengths.

Table 2 presents a table summarizing the results shown in FIG. 7B.

TABLE 2

| | Average over 300-400 nm | | | At 370 nm | | |
|---|---|---|---|---|---|---|
| | % T | % R1 | % R2 | % T | % R1 | % R2 |
| Mid Fe Glass | 64.4% | 6.9% | 6.8% | 85.1% | 7.8% | 7.8% |
| UL Fe Glass | 75.5% | 7.8% | 7.9% | 89.1% | 8.3% | 8.3% |

In certain embodiments, a bird friendly feature may include a UV light source, e.g., emitting with a peak wavelength of between about 320 nm and about 380 nm. The UV light source may be housed in the framing system of the electrochromic window, e.g., in a frame that houses an IGU. In some embodiments, a UV light source may be incorporated into a spacer of an IGU. There may be one or more UV light sources. The one or more UV light sources may project a uniform UV light pattern into the edge of the glass or onto the glass, or e.g., the light sources may project a non-uniform pattern into and/or onto the glass. In certain embodiments, the one or more UV light sources will project a pattern that is visible to birds but not visible to humans. One or more UV light sources may be used alone or in conjunction with UV absorbing and/or reflecting films on the glass and/or in a lamination layer between the lites if lamination is part of the IGU or other electrochromic window construct. The projected and/or reflected pattern may be as described herein, e.g., having less than 2 inches in the horizontal spacing and less than 4 inches in the vertical spacing (e.g., see FIG. 3A and associated description). The pattern can be generated by the light source positioning, masking, or use of holographic elements, e.g., etched or otherwise patterned in the lite associated with the one or more light sources. The one or more UV light sources may be on all the time or they may be sequenced, pulsed or other similar technique to provide a dynamic pattern. The one or more UV light sources may be used without any additional structures or features on the electrochromic window and need not obstruct the viewable area in any way. Also, the UV light projecting system may work day and/or night. In one embodiment, the one or more UV lights are LED lamps, e.g., commercially available LED's with output of 365 nm are readily available from commercial sources in strips and singly. In one embodiment, the one or more UV light sources are combined with holographic lens arrays to project a pattern onto the electrochromic window. The electrochromic window may be tinted or not. In one embodiment, the UV light source is powered by an onboard photovoltaic cell of the electrochromic window, e.g., as described below, or is powered by the window controller, or the UV light has its own power source, such as a battery or a photovoltaic cell.

In certain embodiments, the UV light is attached to the framing system of the electrochromic window after the window is installed. It may be an add-on feature to existing EC windows. The UV light may be tuned specifically to work with the electrochromic film of the window in question, that is, retrofit of existing EC window installations can be achieved by tuning the UV light's output wavelength to be most effective with the electrochromic windows with which the light will be deployed. In certain embodiments, it is desirable to mount the UV light on the underside of the top of the frame, so that the light is projected downward and onto the electrochromic window, and e.g., the light will not collect dust or debris and be obscured. The light may also be provided on a side edge of the frame and/or on a bottom edge of a frame, as desired. In cases where multiple light sources are provided, they may be positioned proximate the same edge of an EC window, or proximate different edges.

In certain embodiments, alone or in combination with other embodiments described herein, an acoustical deterrent is included with an electrochromic window. In one embodiment, the acoustical deterrent operates in ultrasonic wavelengths. The acoustical deterrent may be included in the framing system of the electrochromic window or near it, but generally does not block the viewable area of the window. In one embodiment, the acoustical deterrent is powered by an onboard photovoltaic cell of the electrochromic window, e.g., as described below, or is powered by the window controller, or the acoustical deterrent has its own power source, such as a battery or a photovoltaic cell.

In some embodiments, an electrochromic window may be provided with a photovoltaic (PV) layer thereon. The PV layer may be organic or silicon-based. The PV layer may itself be patterned in a way that allows for birds to see the pattern while humans cannot. In some other cases, a non-patterned PV layer is provided in an electrochromic window having another patterned layer. The PV layer may be electrically connected with a component in/on/connected with the window to thereby allow the PV layer to generate electricity and power the electrochromic window/window controller. In one example, the (patterned or non-patterned) PV film is provided on a sheet that is laminated to an electrochromic IGU, for example on the exterior-facing surface of the exterior pane (often referred to as S1).

An electrochromic window may also be provided with one or more antennae patterned onto any of the surfaces of the window (e.g., surfaces S1, S2, S3, and/or S4 on an IGU). Briefly, the antennae may be formed by positioning thin conductive lines surrounded by an insulator on one or more surfaces of the window. The patterned antennae may serve the purpose of a bird safe layer where it is fabricated in a way that is visible to birds. In one example, a pattern (e.g., as described in relation to FIGS. 3B-3H) may be etched (e.g., using a laser etching method or other etching method) to form one or more antennae, where the pattern is formed in a way that makes the window visible to birds. Further information related to patterning antennae on an electrochromic window is provided in PCT Patent Application No. PCT/US15/62387, filed Nov. 24, 2015, and titled "WINDOW ANTENNA," which is herein incorporated by reference in its entirety.

Integrated Deposition System

In various embodiments, an integrated deposition system may be employed to fabricate electrochromic devices on, for example, architectural glass. The electrochromic devices are used to make IGUs which in turn are used to make electrochromic windows. The term "integrated deposition system" means an apparatus for fabricating electrochromic devices on optically transparent and translucent substrates. The apparatus may have multiple stations, each devoted to a particular unit operation such as depositing a particular component (or portion of a component) of an electrochromic device, as well as cleaning, etching, and temperature control of such device or portion thereof. The multiple stations are fully integrated such that a substrate on which an electrochromic device is being fabricated can pass from one station to the next without being exposed to an external environment.

Integrated deposition systems operate with a controlled ambient environment inside the system where the process stations are located. A fully integrated system allows for better control of interfacial quality between the layers deposited. Interfacial quality refers to, among other factors, the quality of the adhesion between layers and the lack of contaminants in the interfacial region. The term "controlled ambient environment" means a sealed environment separate from an external environment such as an open atmospheric environment or a clean room. In a controlled ambient environment at least one of pressure and gas composition is controlled independently of the conditions in the external environment. Generally, though not necessarily, a controlled ambient environment has a pressure below atmospheric pressure; e.g., at least a partial vacuum. The conditions in a controlled ambient environment may remain constant during a processing operation or may vary over time. For example, a layer of an electrochromic device may be deposited under vacuum in a controlled ambient environment and at the conclusion of the deposition operation, the environment may be backfilled with purge or reagent gas and the pressure increased to, e.g., atmospheric pressure for processing at another station, and then a vacuum reestablished for the next operation and so forth.

In one embodiment, the system includes a plurality of deposition stations aligned in series and interconnected and operable to pass a substrate from one station to the next without exposing the substrate to an external environment. The plurality of deposition stations comprise (i) a first deposition station containing one or more targets for depositing a cathodically coloring electrochromic layer; (ii) a second (optional) deposition station containing one or more targets for depositing an ion conducting layer; and (iii) a third deposition station containing one or more targets for depositing a counter electrode layer. The second deposition station may be omitted in certain cases. For instance, the apparatus may not include any target for depositing a separate ion conductor layer.

Further, any of the layers of the stack may be deposited in two or more stations. For example, where an electrochromic layer and/or counter electrode layer is deposited to include two or more sublayers, each of the sublayers may be deposited in a different station. Alternatively or in addition, two or more sublayers within a layer may be deposited within the same station, in some cases using different targets in the same station. Targets of different compositions may be provided at different portions of the station to deposit the sublayers as desired. In another embodiment, a dedicated station is provided to deposit each layer or sublayer having a distinct composition.

The system may also include a controller containing program instructions for passing the substrate through the plurality of stations in a manner that sequentially deposits on the substrate (i) an electrochromic layer, (ii) an (optional) ion conducting layer, and (iii) a counter electrode layer to form a stack. In one embodiment, the plurality of deposition stations are operable to pass a substrate from one station to the next without breaking vacuum. In another embodiment, the plurality of deposition stations are configured to deposit the electrochromic layer, the optional ion conducting layer, and the counter electrode layer on an architectural glass substrate. In another embodiment, the integrated deposition system includes a substrate holder and transport mechanism operable to hold the architectural glass substrate in a vertical orientation while in the plurality of deposition stations. In yet another embodiment, the integrated deposition system includes one or more load locks for passing the substrate between an external environment and the integrated deposition system. In another embodiment, the plurality of deposition stations include at least two stations for depositing a layer selected from the group consisting of the cathodically coloring electrochromic layer, the ion conducting layer, and the anodically coloring (or optically passive) counter electrode layer.

In some embodiments, the integrated deposition system includes one or more lithium deposition stations, each including a lithium containing target. In one embodiment, the integrated deposition system contains two or more lithium deposition stations. In one embodiment, the integrated deposition system has one or more isolation valves for isolating individual process stations from each other during operation. In one embodiment, the one or more lithium deposition stations have isolation valves. In this document, the term "isolation valves" means devices to isolate depositions or other processes being carried out one station from processes at other stations in the integrated deposition system. In one example, isolation valves are physical (solid) isolation valves within the integrated deposition system that engage while the lithium is deposited. Actual physical solid valves may engage to totally or partially isolate (or shield) the lithium deposition from other processes or stations in the integrated deposition system. In another embodiment, the isolation valves may be gas knifes or shields, e.g., a partial pressure of argon or other inert gas is passed over areas between the lithium deposition station and other stations to block ion flow to the other stations. In another example, isolation valves may be an evacuated regions between the lithium deposition station and other process stations, so that lithium ions or ions from other stations entering the evacuated region are removed to, e.g., a waste stream rather than contaminating adjoining processes. This is achieved, e.g., via a flow dynamic in the controlled ambient environment via differential pressures in a lithiation station of the integrated deposition system such that the lithium deposition is sufficiently isolated from other processes in the integrated deposition system. Again, isolation valves are not limited to lithium deposition stations.

Figure 8A:
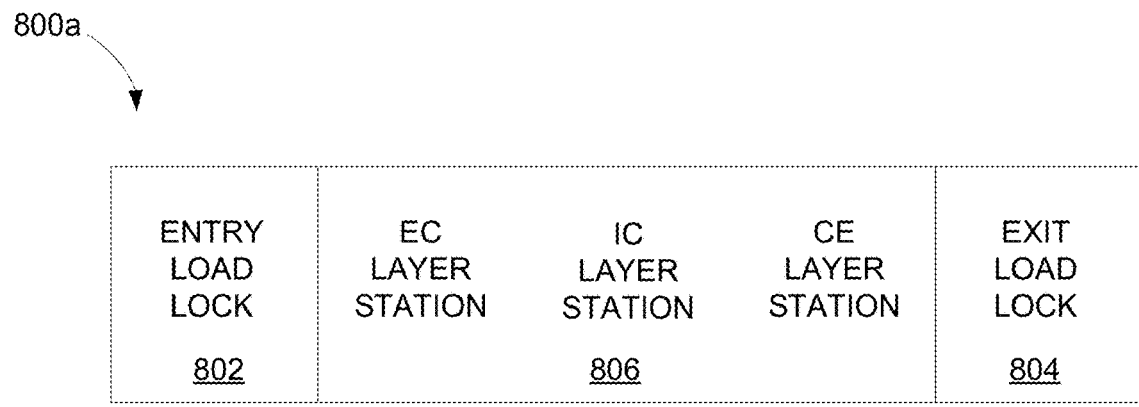
FIGS. 8A-8C show views of integrated deposition systems that may be used to form electrochromic devices as described herein.

FIG. 8A, depicts in schematic fashion an integrated deposition system 800 in accordance with certain embodiments. In this example, system 800 includes an entry load lock, 802, for introducing the substrate to the system, and an exit load lock, 804, for removal of the substrate from the system. The load locks allow substrates to be introduced and removed from the system without disturbing the controlled ambient environment of the system. Integrated deposition system 800 has a module, 806, with a plurality of deposition stations; an EC layer deposition station, an IC layer deposition station and a CE layer deposition station. In the broadest sense, integrated deposition systems need not have load locks, e.g., module 806 could alone serve as the integrated deposition system. For example, the substrate may be loaded into module 806, the controlled ambient environment established and then the substrate processed through various stations within the system. Individual stations within an integrated deposition systems can contain heaters, coolers, various sputter targets and means to move them, RF and/or DC power sources and power delivery mechanisms, etching tools e.g., plasma etch, gas sources, vacuum sources, glow discharge sources, process parameter monitors and sensors, robotics, power supplies, and the like.

Figure 8B:
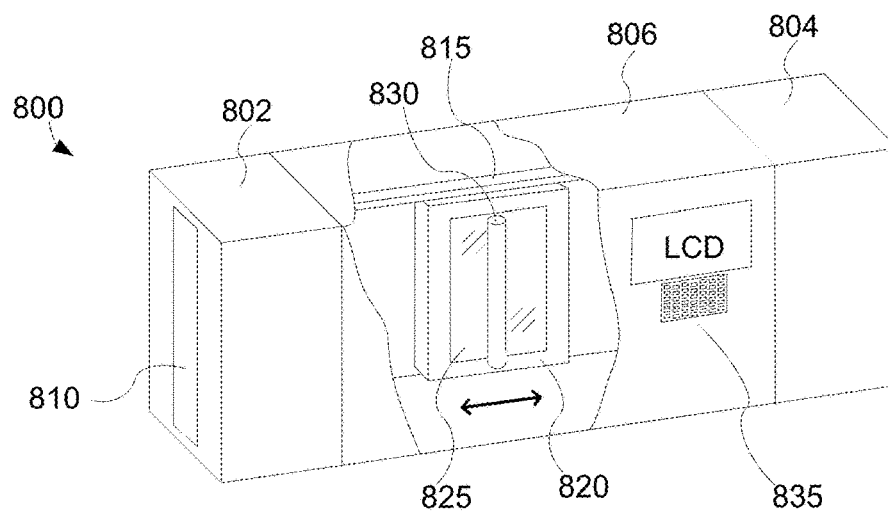

FIG. 8B depicts a segment (or simplified version) of integrated deposition system 800 in a perspective view and with more detail including a cutaway view of the interior. In this example, system 800 is modular, where entry load lock 802 and exit load lock 804 are connected to deposition module 806. There is an entry port, 810, for loading, for example, architectural glass substrate 825 (load lock 804 has a corresponding exit port). Substrate 825 is supported by a pallet, 820, which travels along a track, 815. In this example, pallet 820 is supported by track 815 via hanging but pallet 820 could also be supported atop a track located near the bottom of apparatus 800 or a track, e.g., mid-way between top and bottom of apparatus 800. Pallet 820 can translate (as indicated by the double headed arrow) forward and/or backward through system 800. For example during lithium deposition, the substrate may be moved forward and backward in front of a lithium target, 830, making multiple passes in order to achieve a desired lithiation. Pallet 820 and substrate 825 are in a substantially vertical orientation. A substantially vertical orientation is not limiting, but it may help to prevent defects because particulate matter that may be generated, e.g., from agglomeration of atoms from sputtering, will tend to succumb to gravity and therefore not deposit on substrate 825. Also, because architectural glass substrates tend to be large, a vertical orientation of the substrate as it traverses the stations of the integrated deposition system enables coating of thinner glass substrates since there are less concerns over sag that occurs with thicker hot glass.

Target 830, in this case a cylindrical target, is oriented substantially parallel to and in front of the substrate surface where deposition is to take place (for convenience, other sputter means are not depicted here). Substrate 825 can translate past target 830 during deposition and/or target 830 can move in front of substrate 825. The movement path of target 830 is not limited to translation along the path of substrate 825. Target 830 may rotate along an axis through its length, translate along the path of the substrate (forward and/or backward), translate along a path perpendicular to the path of the substrate, move in a circular path in a plane parallel to substrate 825, etc. Target 830 need not be cylindrical, it can be planar or any shape necessary for deposition of the desired layer with the desired properties. Also, there may be more than one target in each deposition station and/or targets may move from station to station depending on the desired process.

Integrated deposition system 800 also has various vacuum pumps, gas inlets, pressure sensors and the like that establish and maintain a controlled ambient environment within the system. These components are not shown, but rather would be appreciated by one of ordinary skill in the art. System 800 is controlled, e.g., via a computer system or other controller, represented in FIG. 8B by an LCD and keyboard, 835. One of ordinary skill in the art would appreciate that embodiments herein may employ various processes involving data stored in or transferred through one or more computer systems. Embodiments also relate to the apparatus, such computers and microcontrollers, for performing these operations. These apparatus and processes may be employed to deposit electrochromic materials of methods herein and apparatus designed to implement them. The control apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform and/or control the required method and processes.

Figure 8C:
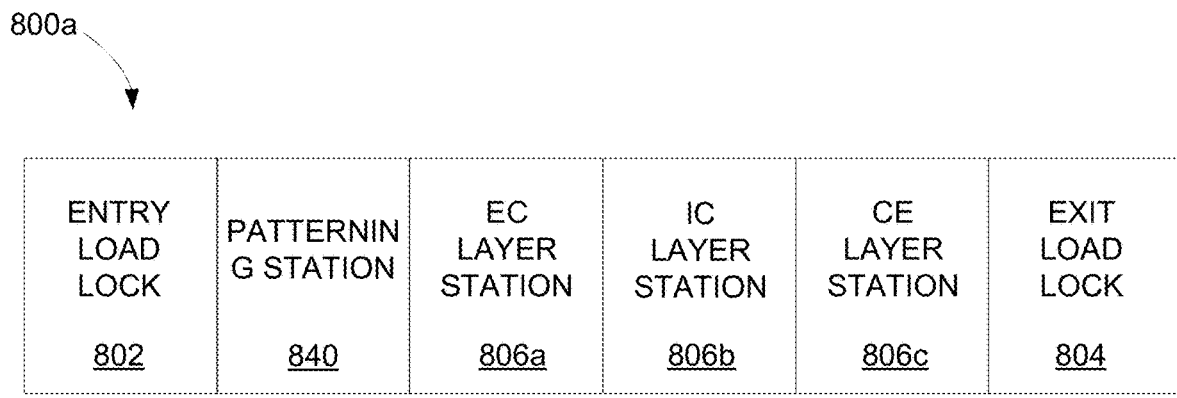

As mentioned, the various stations of an integrated deposition system may be modular, but once connected, form a continuous system where a controlled ambient environment is established and maintained in order to process substrates at the various stations within the system. FIG. 8C depicts integrated deposition system 800a, which is like system 800, but in this example each of the stations is modular, specifically, an EC layer station 806a, an optional IC layer station 806b and a CE layer station 806c. This embodiment also differs from that shown in FIG. 8A in that the deposition system further includes a patterning station 840 for forming the patterned layer discussed herein. In a similar embodiment, the IC layer station 806b is omitted. Modular form is not necessary, but it is convenient, because depending on the need, an integrated deposition system can be assembled according to custom needs and emerging process advancements. For example, lithium deposition stations (not shown) can be inserted at relevant locations to provide lithium as desired for the various layers and sublayers.

In various embodiments, the apparatus may include one or more stations for forming a bird friendly layer, for example a patterned layer and/or a haze-inducing layer. Such stations may be referred to as patterning stations. A patterning station may be configured to etch a pre-patterned layer to form a patterned layer. Etching may occur through any of the methods discussed herein including, but not limited to, laser etching, plasma etching, ion milling, etc. Appropriate hardware may be provided to accomplish these processes. In some cases, an x-y stage may be provided in the patterning station to help move the substrate as etching occurs (e.g., laser etching). In some embodiments, the patterning station may include one or more masks that are applied to a substrate to help form the pattern (either through etching or deposition). A positioning system may be included to position the mask as desired on the substrate.

In a number of embodiments, the patterning station may be provided as multiple individual (but connected) stations. Many configurations are possible. In one example, a first patterning station may be used to deposit a layer of pre-patterned material, a second patterning station may be used to apply a mask to the substrate, a third patterning station may be used to selectively etch the pre-patterned layer to form a patterned layer, and a fourth patterning station may be used to remove the mask from the substrate. In another example, a first patterning station may be used to position a mask on the substrate, a second patterning station may be used to selectively deposit material on the substrate, and a third patterning station may be used to remove the mask from the substrate. The mask application and removal may also be done in the same chamber as an etching and/or deposition process, as mentioned above. Integrated depositions systems such as the ones shown in FIGS. 8A-8C may also have a TCO layer station (not shown) for depositing the TCO layer on the EC stack. Depending on the process demands, additional stations can be added to the integrated deposition system, e.g., stations for heating/annealing processes, cleaning processes, laser scribes, rotation processes, depositing capping layers, depositing defect mitigating insulating layers (DMILs), performing MTC, fabricating bird friendly layers (e.g., stations for depositing a pre-patterned layer, stations for defining a pattern on a pre-patterned layer, stations for etching a pre-patterned layer to form a patterned layer, stations for making a layer selectively hazy), etc.

In some embodiments, one or more transparent substrates of an electrochromic window may include a pattern formed or applied by a laser. The pattern, examples of which were described in connection with FIGS. 3B-3H hereinabove, may be readily discerned by birds of at least a number of species. In some embodiments, the laser-formed patterns may be configured to be imperceptible or nearly imperceptible by humans. In other embodiments, the pattern may be visible to humans, but designed to be decorative in nature, unobtrusive or otherwise unobjectionable for the intended use of the window. Advantageously, the pattern may be created using a laser to induce microcrack formation and/or change a local refraction index within or on a surface of one or more of the transparent substrates. By judicious selection of laser operating parameters, the pattern may be safely formed without regard to whether or not an electrochromic stack is disposed on the substrate.

In some embodiments, a pattern is created using a laser marking instrument. The pattern may be likewise visible to the human and avian eye. The pattern may be composed of elements, such as lines or dots, that appear opaque, semi-transparent or translucent and thus contrast with portions of the transparent substrate adjacent to the pattern elements. The elements forming the pattern may be of any shape and size and may be separated by several centimeters or less. In some implementations, a cross sectional dimension of the elements may be small enough (e.g., 0.1-0.5 mm) to be imperceptible or nearly imperceptible by humans, and yet large enough to be perceptible by birds. Whether or not perceptible to humans, the pattern may be configured to create a visual deterrent to birds which recognize the space the window occupies as a barrier to be avoided.

In some embodiments, a laser operating regime is selected to form patterns with the desired opacity and relief without risk of damage to an electrochromic stack disposed on the substrate. For example, the laser operating regime may contemplate a train of micro-pulses, each micro-pulse being a few nanoseconds duration each, which integrates into a longer duration laser pulse of about 100-1000 microsecond. This regime has been found to diminish thermal stresses and avoids causing damage to any electrochromic stack that may be disposed on the substrate. Suitable lasers for the contemplated pattern formation include, for example, carbon dioxide ($CO_2$) lasers having a wavelength of 10600 nm and nanosecond yttrium-aluminum-garnet (YAG) laser having a wavelength of 1064 nm or 532 nm.

Figure 9A:
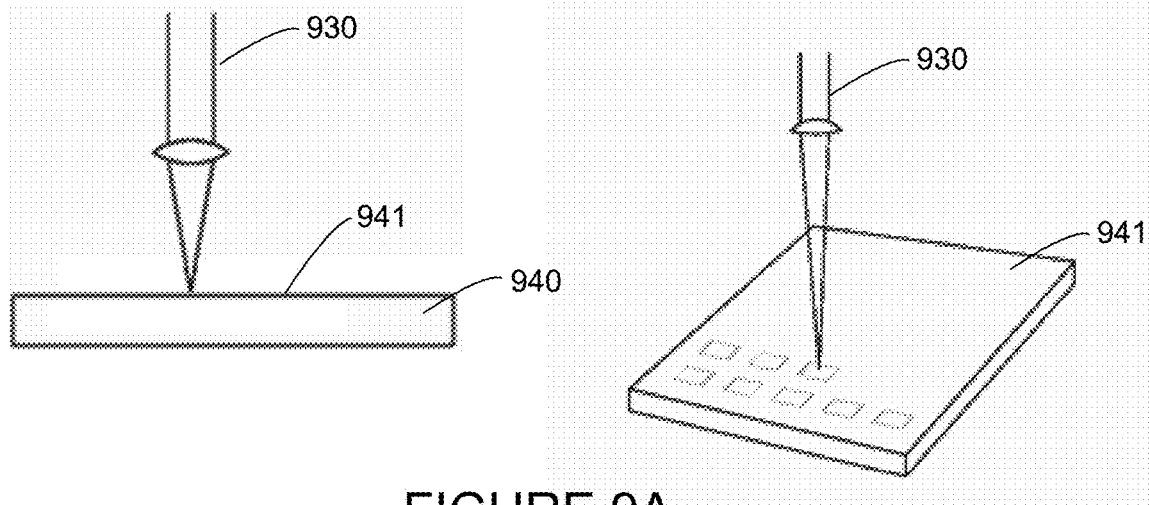
FIG. 9A illustrates an example of forming a pattern on a surface of a glass substrate, according to an embodiment.

In some embodiments, the optical properties of a surface of a glass substrate may be locally changed. Where the glass substrate is, or is intended to be, integrated into an IGU, the surface may face an interior or exterior of the IGU. Moreover, the glass substrate may be an inboard or outboard lite of the IGU. Where the glass substrate has an electrochromic layer already disposed thereon, the glass surface to which the laser is applied may be opposite to the surface on which the electrochromic stack is disposed. FIG. 9A illustrates an example of forming a pattern on a surface of a glass substrate. A laser beam 930 is focused to impinge a surface 941 of the substrate 940.

Figure 9B:
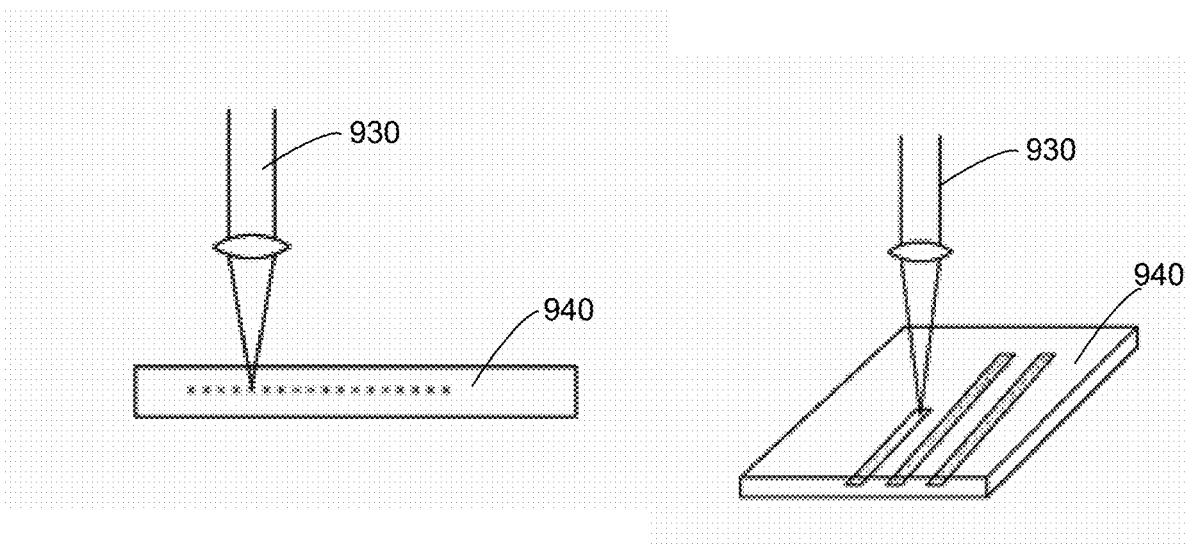
FIG. 9B illustrates an example of forming a pattern in the interior of a glass substrate, according to an embodiment.

In some embodiments, the optical properties of an interior portion of a glass substrate may be locally changed. For example, by appropriately focusing laser radiation within the glass substrate, optically scattering microcracks may be created. The microcracks may result from the focused laser radiation causing local heating of the glass, with a consequent thermal expansion that creates tensile stresses which in turn produce the microcracks. FIG. 9B illustrates an example of forming a pattern in the interior of a glass substrate. Here, the laser beam 930 is focused inside the glass substrate 940 and the pattern is formed between the opposite surfaces of the substrate (either or both of which surfaces may include an electrochromic stack).

In some embodiments the optical properties of a glass substrate may be locally changed without necessarily creating microcracks. For example, a laser-induced local change to the refraction index may be configured to form a pattern that is visible to birds but invisible to humans. Suitable lasers for the contemplated pattern formation include, as indicated hereinabove, $CO_2$ lasers having a wavelength of 10600 nm and YAG lasers having a wavelength of 1064 nm or 532 nm.

In some embodiments, a pulse fluence of the laser may be configured to have a value below a microcracking threshold of the glass, but that is sufficient to create a local densification that locally increases the refractive index of the glass. For example a "burst mode" laser operating regime has been considered wherein each laser pulse consists of a train of 4 to 10 micro-pulses. The inventors have found that such a train of pulses may produce a cumulative effect such that the refraction index of the irradiated zone is increased without creating microcracks. For example, the refraction index may be increased from a range of 1.5-1.53 (typical for glass in the spectral range of 350 to 400 nm) to a range of about 1.55-1.57. The local zones with elevated refraction index selectively absorb an increased fraction of UV light. As indicated hereinabove, it is known that many bird species can discriminate in wavelengths of light in the near-UV range, which wavelengths are smaller than the threshold wavelengths observable by humans, typically about 400 nm. Thus, birds may be expected to see the pattern while humans will not.

In some embodiments, filament propagation, or "filamentation" conditions may be exploited in order to increase the range of depths within which a change in the refraction index may be produced. Filamentation relates to an optical effect which facilitates the propagation of a beam of light through a medium without diffraction.

In some further embodiments, a diffractive pattern may be formed on the glass surface, by means of a laser treatment. The pattern may be configured to diffract incident light under different angles for different parts of spectrum. As a result, the pattern will be visible to an approaching bird irrespective of its angle of trajectory with respect to the window surface. The pattern may be visible to humans as well as to birds.

Figure 10A:
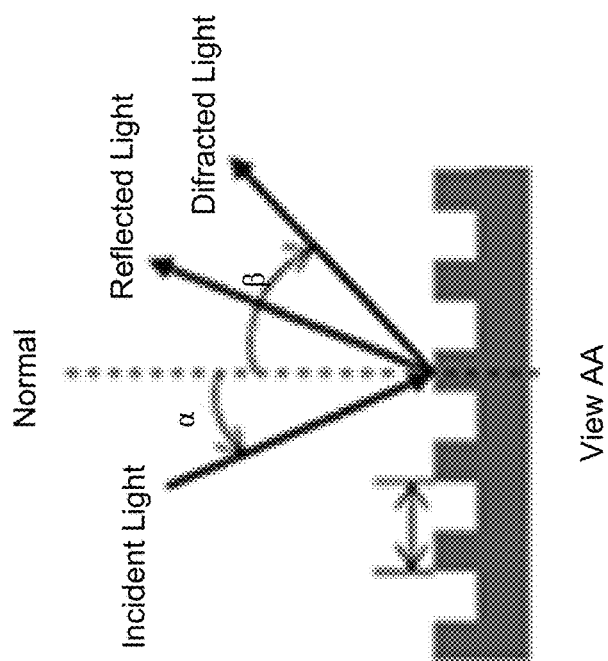
FIGS. 10A-C illustrate an example of forming a diffraction grating, according to an embodiment.
Figure 10A:
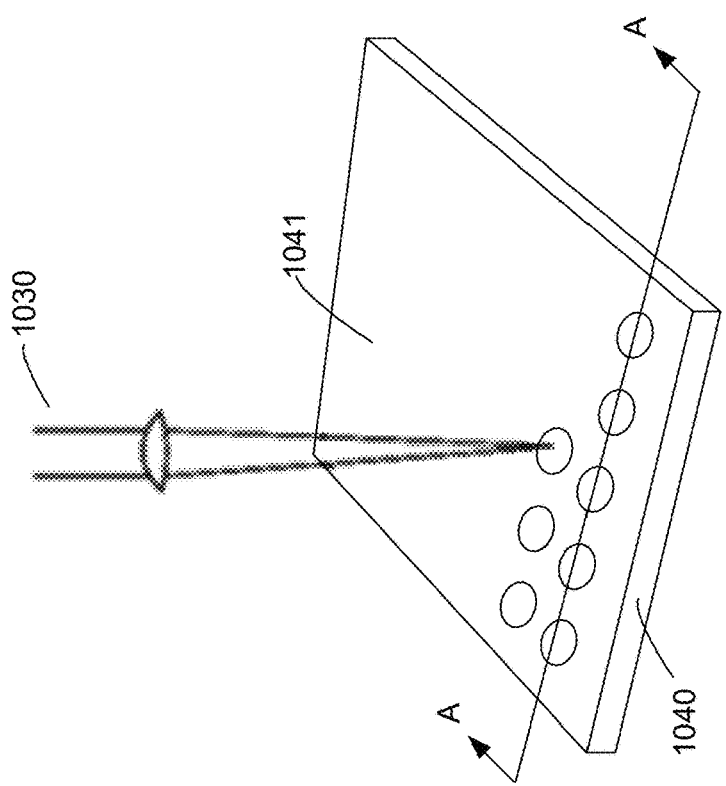

In some embodiments, the pattern may include a number of micro-spots that are aligned and separated from each other so that they form a diffraction grating. FIG. 10A illustrates an example of forming a pattern on a surface of a glass substrate. A laser beam 1030 is focused to impinge a surface 1041 of the substrate 1040. As may be observed in View AA, the diffraction grating may cause light incident on the grating at an angle α to normal to be diffracted at an angle β to normal.

The diameters of the micro-spots may be, for example, in an approximate range between about 1 and about 50 μm, while the separation between them may be in an approximate range between about 1 and about 100 μm. By modifying the dimensions of the micro-spots and the separation between them, the power of separation of the diffraction grating can be changed. The spots may be created inside the glass and/or on the surface.

In one embodiment of the invention, the diffraction grating is formed on the glass surface by an ablation process. A suitable laser for the contemplated pattern formation includes a YAG laser having a wavelength of 355 nm or 266 nm, for example. The laser may be operated, in a burst mode, each burst including a few micropulses, each micropulse having a pulse duration in the nanosecond range. In some embodiments, a burst may include a train of at least two micropulses. As examples, bursts of 4-5 micropulses, 3-6 micropulses or 2-7 micropulses have been considered.

Such a train of pulses has been found to produce a cumulative effect, where the first pulse increases the refraction index of the irradiated zone at a layer near the surface from a range of 1.5-1.53 (typical for glass in the spectral range of 350 to 400 nm) to a range of about 1.55-1.57. As a result, a microlens may be formed that may further focus the laser beam, and produce an energy density above a threshold for ablation. In some embodiments, the most deeply ablated portion may amount to a micro-perforation having a diameter of only a few microns (e.g., ≤10) in diameter. Advantageously, the micoperforation may increase the resolution of the diffraction grating.

Figure 10B:
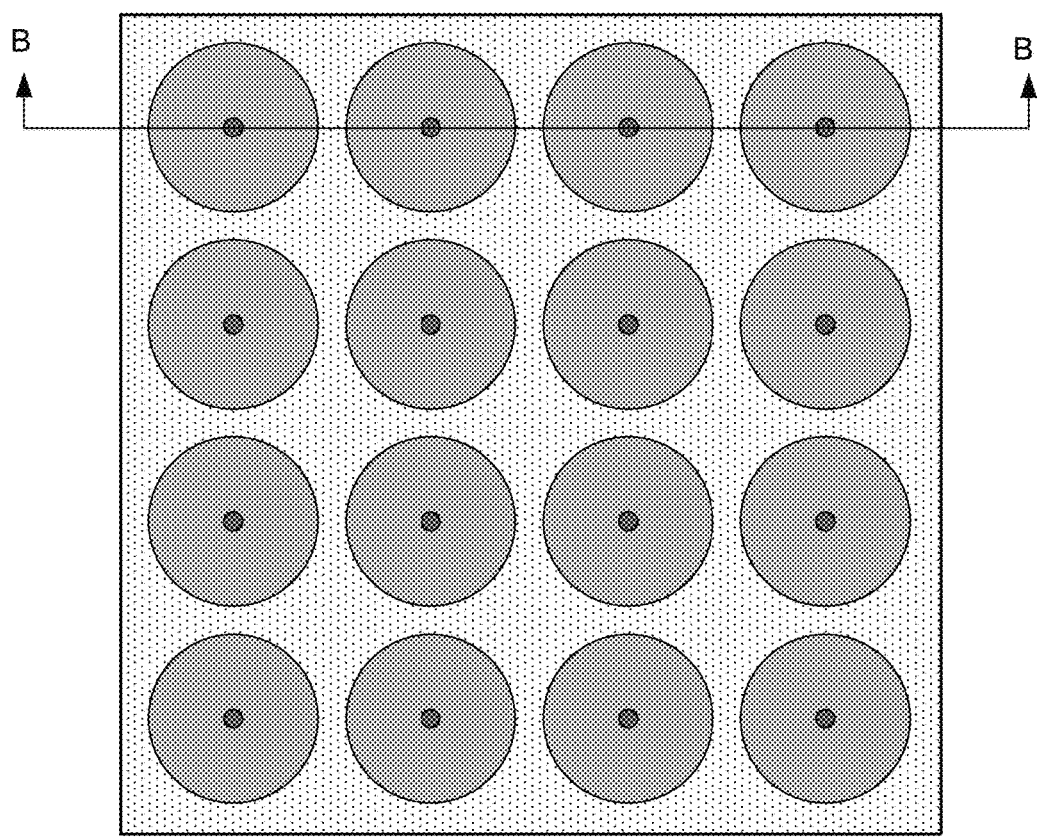
Figure 10C:
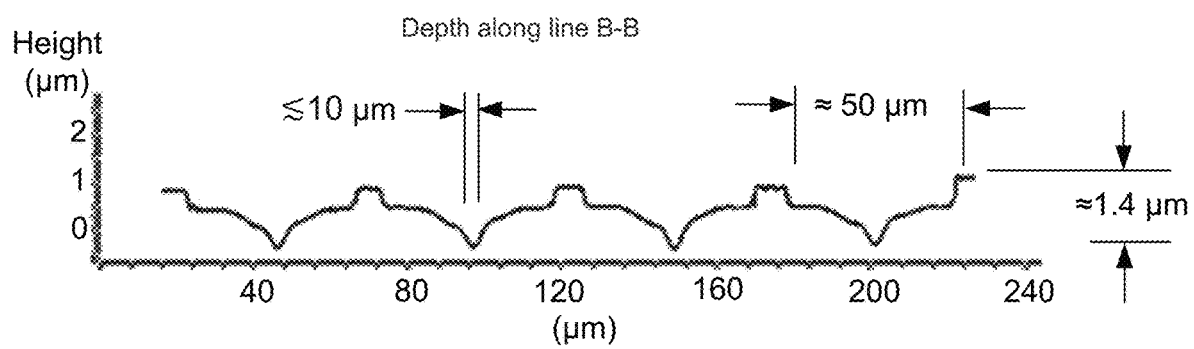
Figure 11:
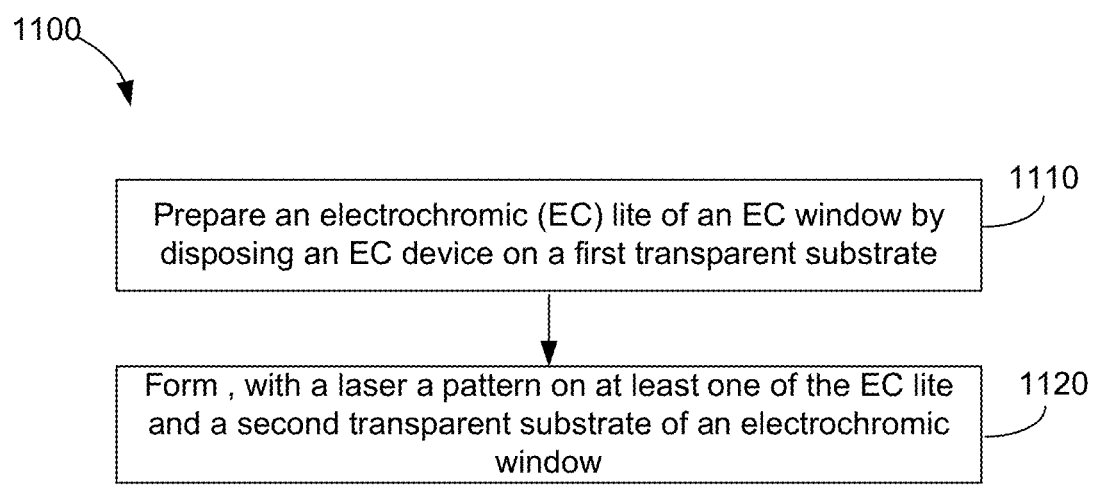
FIG. 11 is a flow chart illustrating an example method of forming a pattern on a transparent substrate of an electrochromic window, according to an implementation.

FIG. 10B shows a plan view of a pattern configured as a diffraction grating formed in accordance with the above described techniques while FIG. 10C illustrates a depth profile of the pattern, created by laser ablation along the line B-B. As can be seen in the figure, for this specific pattern, the crater diameter is about 50 m, while the depth at the center of crater is about 1.4 μm. This means that the crater has a diameter nearly 40 times larger than depth. As a result of this configuration, the likelihood of trapping environmental contamination is reduced Referring now to FIG. 11, a method 1100 for forming a pattern on a transparent substrate of an electrochromic window is illustrated. As described hereinabove, at least one of the substrates of the electrochromic window is an electrochromic (EC) lite having an EC device disposed thereon. At block 1110, the EC lite may be prepared by disposing an EC device on a first transparent substrate. At block 1120, a pattern is formed, with a laser, the pattern including a first feature configured to provide a set of optical properties different than that of the transparent substrates. The pattern may include elements including one or more intersecting or non-intersecting stripes or bars and/or a plurality of dots. The set of optical properties may include one or more characteristics of refractivity, reflectivity and diffraction.

In some embodiments, forming the pattern on the EC light may include operating the laser in a regime selected to form the pattern without damaging the electrochromic device.

In some embodiments, the laser operating regime includes a train of micro-pulses, each micro-pulse being less than 10 nanoseconds duration and the train of micro-pulses integrates into a laser exposure period of about 100-1000 microsecond.

In some embodiments, forming the pattern on the EC includes operating the laser in a regime selected to form the pattern elements by inducing local changes to a refraction index of the EC light.

In some embodiments, the pattern may includes a diffraction grating on a surface of the EC light opposite to the electrochromic device and forming the diffraction grating on the EC light includes operating the laser in a regime selected to locally ablate micro-spots each micro-spot having a dimension in the range of 1 to 50 m.

Although the foregoing embodiments have been described in some detail to facilitate understanding, the described embodiments are to be considered illustrative and not limiting. It will be apparent to one of ordinary skill in the art that certain changes and modifications can be practiced within the scope of the appended claims.

What is claimed is:

1. A method of fabricating an electrochromic (EC) window, the method comprising:
    preparing an EC lite of the EC window by disposing an EC device on a first transparent substrate, and
    forming, with a laser, a pattern on or in at least one of the EC lite and a second transparent substrate of the EC window, the pattern including a first feature configured to provide a set of optical properties different than optical properties of the transparent substrates; wherein the set of optical properties includes one or more characteristics of refractivity, reflectivity and diffraction;
    the laser operating regime includes a train of micro-pulses, each micro-pulse being less than 10 nanoseconds duration; and
    the train of micro-pulses integrates into a laser exposure period of about 100-1000 microseconds.

2. The method of claim 1, wherein forming the pattern on the EC lite includes operating the laser in a regime selected to form the pattern without damaging electrochromic device.

3. The method of claim 1, wherein forming the pattern on the EC lite includes operating the laser in a regime selected to form the pattern elements by inducing local changes to a refraction index of the EC lite.

4. The method of claim 3, wherein the laser-induced local change to the refraction index is configured to result in the pattern being visible to birds and invisible to humans.

5. The method of claim 3, wherein the laser operating regime results in a pulse fluence that creates local densification of the EC lite that locally increases the refractive index of the EC lite and is below a microcracking threshold of the EC lite.

6. The method of claim 5, the train of micro-pulses includes less than 100 micropulses.

7. The method of claim 5, the train of micro-pulses includes less than 20 micropulses.

8. The method of claim 1, wherein the pattern includes a diffraction grating on a surface of the EC lite opposite to the electrochromic device and forming the diffraction grating on the EC lite includes operating the laser in a regime selected to locally ablate micro-spots, each micro-spot having a dimension in the range of 1 to 50 μm.

9. The method of claim 8, wherein the micro-spots have a diameter to depth ratio greater than 20.

10. The method of claim 1, wherein the pattern comprises elements including one or more intersecting or non-intersecting stripes or bars and/or a plurality of dots.

11. The method of claim 1, wherein the pattern is formed on the EC lite.

12. The method of claim 11, wherein the pattern is formed on a surface of the EC lite opposite to the electrochromic device.

13. The method of claim 11, wherein the pattern includes a sequence of microcracks formed on a surface or in an interior of the EC lite by operating the laser.

14. The method of claim 1, wherein the electrochromic window is configured such that the pattern is positioned outboard of the electrochromic device.

15. The method of claim 1, wherein the pattern is formed on the window after the EC lite and at least one additional transparent substrate are formed into an insulated glass unit (IGU).

* * * * *